United States Patent
Kim et al.

(10) Patent No.: US 10,762,303 B2
(45) Date of Patent: Sep. 1, 2020

(54) METHOD FOR COLLECTING TRANSLATED CONTENT, AND TRANSLATION SERVER

(71) Applicant: SAMSUNG ELECTRONICS CO., LTD., Suwon-si (KR)

(72) Inventors: Hyun-kyung Kim, Suwon-si (KR); Hak-jung Kim, Goyang-si (KR); Yoon-jin Yoon, Yongin-si (KR); Haeng-sun Lim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 129 days.

(21) Appl. No.: 16/066,358

(22) PCT Filed: Dec. 26, 2016

(86) PCT No.: PCT/KR2016/015272
§ 371 (c)(1),
(2) Date: Jun. 27, 2018

(87) PCT Pub. No.: WO2017/116098
PCT Pub. Date: Jul. 6, 2017

(65) Prior Publication Data
US 2019/0012314 A1  Jan. 10, 2019

(30) Foreign Application Priority Data

Dec. 30, 2015  (KR) .......................... 10-2015-0189449

(51) Int. Cl.
*G06F 40/47* (2020.01)
*G06F 40/49* (2020.01)
(Continued)

(52) U.S. Cl.
CPC .......... *G06F 40/49* (2020.01); *G06F 16/3337* (2019.01); *G06F 40/47* (2020.01);
(Continued)

(58) Field of Classification Search
CPC .............................. G06F 17/289; G06F 40/47
See application file for complete search history.

(56) References Cited

U.S. PATENT DOCUMENTS

| 9,639,527 B2 * | 5/2017 | Shoshan | G06F 17/289 |
| 2011/0082684 A1 * | 4/2011 | Soricut | G06F 17/289 704/2 |

(Continued)

FOREIGN PATENT DOCUMENTS

| KR | 10-2004-0037367 A | 5/2004 |
| KR | 10-2010-0019596 A | 2/2010 |

(Continued)

OTHER PUBLICATIONS

Communication dated Mar. 20, 2017, issued by the International Searching Authority in International Application No. PCT/KR2016/015272 (PCT/ISA/210 and PCT/ISA/237).

(Continued)

*Primary Examiner* — Daniel Abebe
(74) *Attorney, Agent, or Firm* — Sughrue Mion, PLLC

(57) ABSTRACT

Provided are a method by which a translation server collects translated content from at least one device, and a translation server therefor. The translation server may provide, to users using at least one device, a translation request category for participation in translation, and collect translated content from the users. The translation server may provide rewards to the users providing the translated content.

15 Claims, 17 Drawing Sheets

(51) Int. Cl.
*G06Q 50/10* (2012.01)
*G06F 40/51* (2020.01)
*G06F 40/58* (2020.01)
*G06F 16/33* (2019.01)

(52) U.S. Cl.
CPC .............. *G06F 40/51* (2020.01); *G06F 40/58* (2020.01); *G06Q 50/10* (2013.01)

(56) References Cited

U.S. PATENT DOCUMENTS

| | | | |
|---|---|---|---|
| 2012/0316861 A1* | 12/2012 | Custer | G06F 17/289 |
| | | | 704/2 |
| 2013/0144594 A1 | 6/2013 | Bangalore et al. | |
| 2013/0197898 A1 | 8/2013 | Choi et al. | |
| 2013/0282359 A1 | 10/2013 | Kim et al. | |
| 2014/0303959 A1 | 10/2014 | Orsini et al. | |
| 2016/0162478 A1* | 6/2016 | Blassin | G06Q 10/06311 |

FOREIGN PATENT DOCUMENTS

| | | |
|---|---|---|
| KR | 10-2013-0014730 A | 2/2013 |
| KR | 10-2013-0062453 A | 6/2013 |
| KR | 10-2013-0089566 A | 8/2013 |
| KR | 10-2014-0049150 A | 4/2014 |
| KR | 10-2014-0066921 A | 6/2014 |

OTHER PUBLICATIONS

Communication dated Nov. 19, 2018, issued by the European Patent Office in counterpart European Patent Application No. 16882050.4.

* cited by examiner

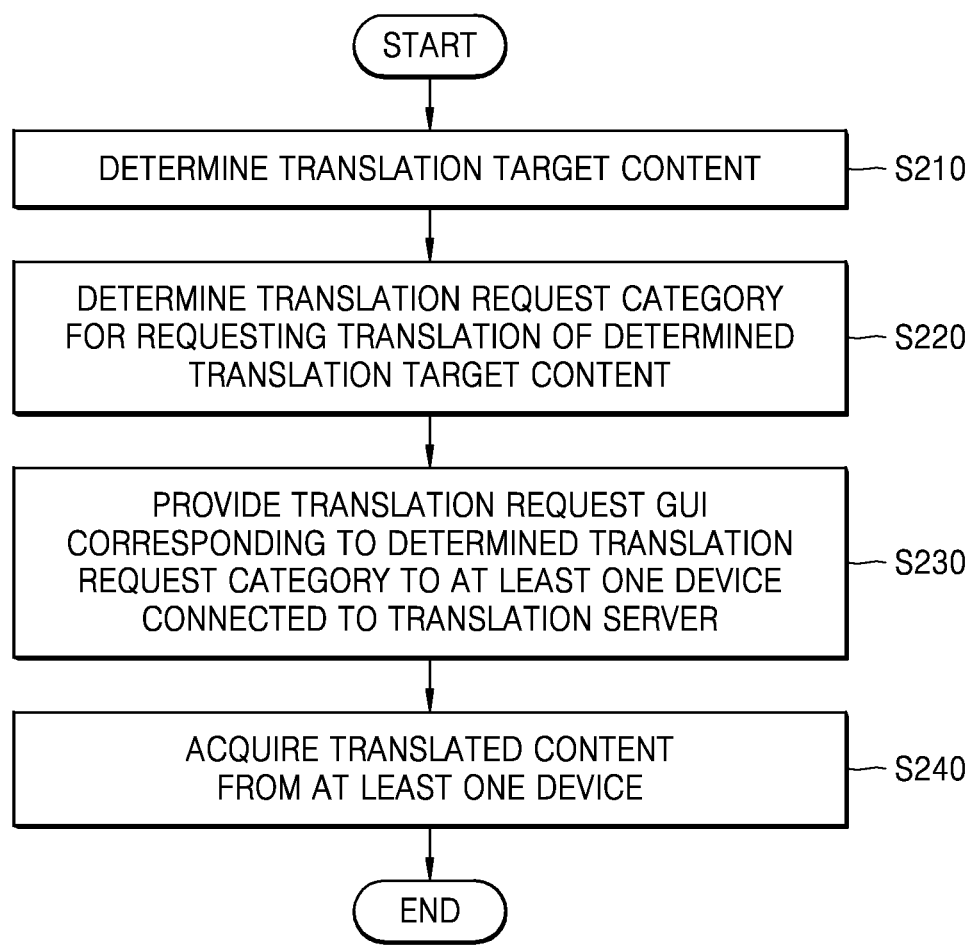

FIG. 4

| TRANSLATION REQUEST CATEGORY (400) | | TRANSLATED CONTENT (420) | | | | | | | | | |
|---|---|---|---|---|---|---|---|---|---|---|---|
| | | UNTRANSLATED WORD (420-1) | COINED WORD (420-2) | ACRONYM (420-3) | PROPER NOUN (420-4) | SYNONYM (420-5) | HOMONYM (420-6) | SINGLE CORPUS (420-7) | CORPUS PAIR (420-8) | PHRASE (420-9) | WORD ORDER (420-10) |
| DIRECT TRANSLATION REQUEST CATEGORY (411) | TRANSLATION INPUT (411-1) | O | O | O | O | O | O | O | O | X | X |
| | TRANSLATION CORRECTION (411-2) | O | O | O | O | O | O | O | O | O | O |
| TRANSLATION VERIFICATION CATEGORY (412) | TRANSLATION SCORE EVALUATION (412-1) | X | X | X | X | X | X | X | X | X | X |
| | TRANSLATION SELECTION (412-2) | X | X | X | X | X | X | O | O | O | X |
| EDUCATIONAL CONTENT PROVISION CATEGORY (413) | FILLING IN BLANKS (413-1) | X | X | X | X | O | X | X | X | X | X |
| | READING/GRAMMAR/ PRONUNCIATION (413-2) | X | X | X | X | X | X | X | X | X | X |
| AUDIOVISUAL CONTENT PROVISION CATEGORY (414) | MUSIC/MOVIE (414-1) | O | O | O | O | O | O | X | X | X | X |
| | NEWSPAPER ARTICLE (414-2) | O | O | O | O | O | O | X | X | X | X |
| GAME CONTENT PROVISION CATEGORY (415) | PICTURE TITLE (415-1) | X | X | X | X | X | X | O | X | X | X |
| | WORD PUZZLE (415-2) | O | O | O | O | O | X | O | O | X | X |

FIG. 8

| CATEGORY (810) | GUI (820) | USER (830) | REWARD TYPE (840) | REWARD WEIGHT (850) |
|---|---|---|---|---|
| DIRECT TRANSLATION REQUEST (811) | GUI #1 (821) | GENERAL, EXPERT (831) | POINT, COUPON (841) | MEDIUM (851) |
| TRANSLATED CONTENT VERIFICATION (812) | GUI #2 (822) | GENERAL, EXPERT (832) | POINT, COUPON, GIFT (842) | HIGH (852) |
| EDUCATIONAL CONTENT PROVISION (813) | GUI #3 (823) | STUDENT, CHILD (833) | POINT, VOUCHER (843) | MEDIUM (853) |
| AUDIOVISUAL CONTENT PROVISION (814) | GUI #4 (824) | STUDENT, CHILD (834) | POINT, MOVIE TICKET (844) | LOW (854) |
| GAME CONTENT PROVISION (815) | GUI #5 (825) | STUDENT, GENERAL CHILD (835) | POINT, VOUCHER (845) | LOW (855) |

METHOD FOR COLLECTING TRANSLATED CONTENT, AND TRANSLATION SERVER

TECHNICAL FIELD

The present disclosure relates to a method by which a translation server collects translated content from at least one device connected through a network, and a translation server therefor. In particular, the present disclosure relates to a method of providing translation target content to at least one user of at least one device by using an Internet network and collecting translated content from the at least one user, and a translation server therefor.

BACKGROUND ART

In accordance with the development of devices, there is an increasing need for technology for automatic translation of text or speech through devices. However, there is a limit to the improvement of a translation rate with respect to translation performed by a grammar method of the related art. Recently, a statistical translation engine using statistical data has been actively developed. For example, research and development has been conducted to improve the performance of a translation engine through the collection of translated content based on a user's search or translation results through a translation service implemented by a mobile application or a home page connecting to a translation server.

However, there is a limitation in that a translated content collection method is partially performed only by users having an intention to translate.

DESCRIPTION OF EMBODIMENTS

Solution to Problem

In order to improve the translation rate of a translation server, the present disclosure provides a method of providing a translation request category for participation in translation to a plurality of users connected to a translation server through an Internet network and collecting translated content corresponding to the translation request category from the plurality of users, and a translation server therefor.

Also, the present disclosure provides a translated content collection method and a translation server for inducing participation in translation by providing a reward corresponding to a participation category to a user providing translated content.

Advantageous Effects of Disclosure

The translation server according to an embodiment of the present disclosure may improve the quality of translation by providing a crowd sourcing translation service for collecting translated content from a group through a simple and interesting translation request category for inducing participation in translation by a crowd using a plurality of devices.

BRIEF DESCRIPTION OF DRAWINGS

FIG. 2 is a flowchart illustrating a method by which a translation server collects translated content, according to an embodiment of the present disclosure.

FIG. 4 is a diagram illustrating a type of translated content that may be collected according to a translation request category provided by a translation server, according to an embodiment of the present disclosure.

FIG. 8 is a diagram illustrating the relationship between a translation request category, a translation request graphical user interface (GUI), a translated-content-providing user, a reward type, and a reward weight, according to an embodiment of the present disclosure.

BEST MODE

Figure 1:
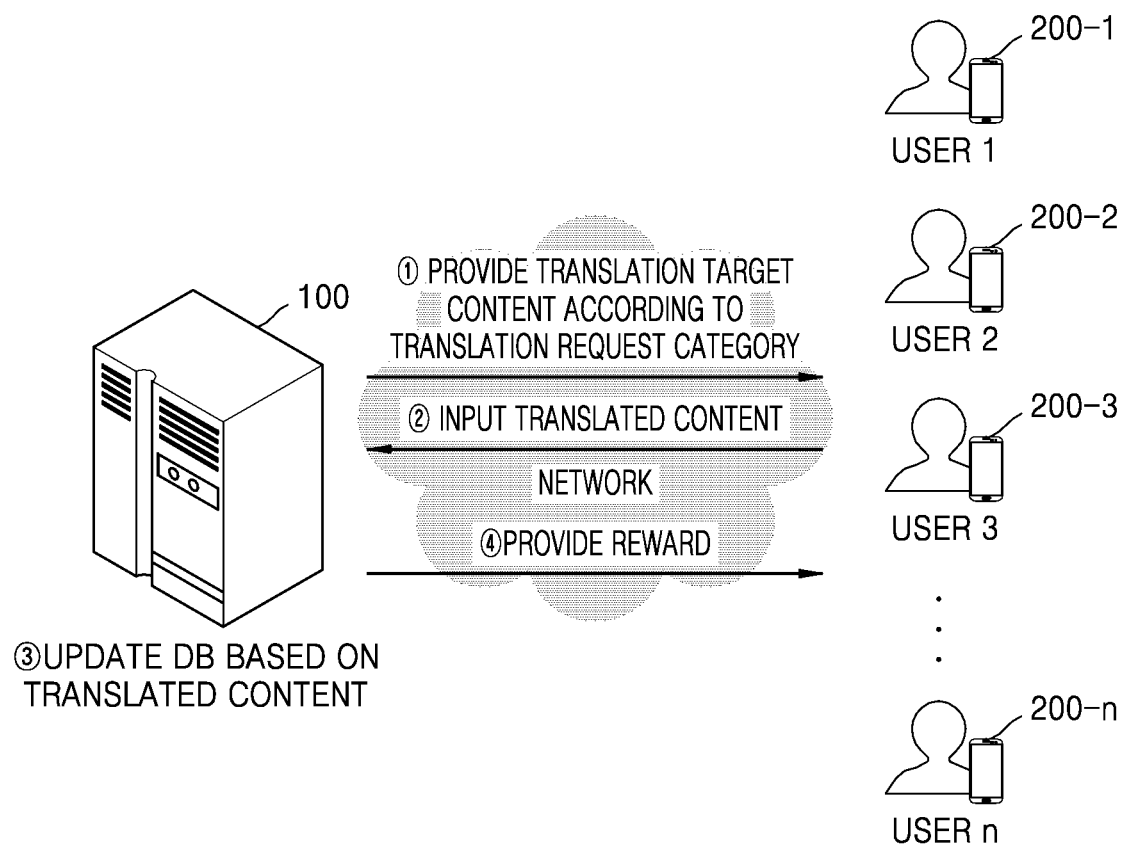
FIG. 1 is a conceptual diagram illustrating a method by which a translation server collects translated content, according to an embodiment of the present disclosure.

According to an aspect of the present disclosure, a method by which a server collects translated content includes: determining translation target content constructed in a first language; determining a translation request category for requesting translation of the determined translation target content; providing a translation request graphical user interface (GUI) corresponding to the determined translation request category to at least one device connected to the server; and acquiring, from the at least one device, translated content translated from the translation target content into a second language, wherein the translation request GUI includes a translation request message corresponding to the determined translation request category, and the translated content is input to the device through the translation request GUI.

For example, the determining of the translation target content may include selecting at least one of a corpus, a coined word, an acronym, a proper noun, a technical term, and a dialogue as translation target content, according to a predetermined criterion.

For example, the translation request category may include at least one of a direct translation request category, a translated content verification category, an educational content provision category, an audiovisual content provision category, and a game content provision category.

For example, the translation request GUI may be provided as a predetermined type with respect to the translation request category.

For example, the at least one device may include at least one of a personal computer (PC), a mobile phone, and an application of a mobile phone that are used by at least one user providing the translated content.

For example, the method may further include verifying the acquired translated content.

For example, the verifying of the acquired translated content may include: receiving an evaluation input of a user for evaluating the acquired translated content; and determining reliability of the acquired translated content, based on the received evaluation input.

For example, the method may further include evaluating the user providing the acquired translated content, based on the received evaluation input, wherein the verifying of the translated content may include verifying the translated content based on an evaluation result regarding the user providing the translated content.

For example, the method may further include updating a database of the server, based on the acquired translated content.

For example, the method may further include, by using the at least one device, providing a reward to at least one user providing the translated content.

For example, the providing of the reward may include providing a differential point to the at least one user providing the translated content, according to the determined translation request category.

For example, the providing of the reward may include: receiving a user input for evaluating the user providing the acquired translated content; and providing the differential point based on the user input.

According to another aspect of the present disclosure, a translation server for collecting translated content includes: a controller configured to determine translation target content constructed in a first language, determine a translation request category for requesting translation of the determined translation target content, and determining a GUI corresponding to the determined translation request category; a communicator configured to transmit the determined GUI to at least one device connected to the server and acquire, from the at least one device, translated content translated from the translation target content into a second language; and a storage storing the acquired translated content, wherein the GUI includes a translation request message corresponding to the determined translation request category, and the translated content is input to the device through the GUI.

For example, the controller may further be configured to select, as translation target content, at least one of a corpus, a coined word, an acronym, a proper noun, a technical term, and a dialogue, according to a predetermined criterion.

For example, the translation request category may include at least one of a direct translation request category, a translated content verification category, an educational content provision category, an audiovisual content provision category, and a game content provision category.

For example, the controller may further be configured to generate a translation request GUI of a predetermined type with respect to the translation request category.

For example, the at least one device may include at least one of a PC, a mobile phone, and an application of a mobile phone that are used by at least one user providing the translated content.

For example, the controller may be further configured to verify the acquired translated content.

For example, the communicator may be further configured to receive an evaluation input of a user for evaluating the acquired translated content, and the controller may be further configured to determine reliability of the acquired translated content, based on the received evaluation input.

For example, the controller may be further configured to evaluate the user providing the acquired translated content and verify the translated content, based on an evaluation result about the user providing the translated content.

For example, the controller may further be configured to update the translated content stored in the storage, based on the acquired translated content.

For example, the controller may further be configured to provide a reward to at least one user providing the translated content by using the at least one device.

For example, the controller may, according to the determined translation request category, provide a differential point to the at least one user.

For example, the communicator may further be configured to receive a user input for evaluating the user providing the acquired translated content, and the controller may further be configured to provide the differential point based on the user input.

According to another aspect of the present disclosure, provided is a computer-readable recording medium having recorded thereon a program that, when executed by a computer, performs the method by which the translation server collects translated content.

MODE OF DISCLOSURE

This application claims the benefit of Korean Patent Application No. 10-2015-0189449 filed on Dec. 30, 2015 in the Korean Intellectual Property Office.

Hereinafter, embodiments of a method of collecting translated content by a translation server and a translation server thereof will be described in detail with reference to the accompanying drawings so that those of ordinary skill in the art may easily implement the embodiments. However, the present disclosure may be embodied in many different forms and should not be construed as being limited to the embodiments set forth herein. Those of ordinary skill in the art may implement the present disclosure in various other forms without departing from the spirit and scope of the present disclosure. That is, particular structural or functional descriptions are provided for purposes of describing embodiments of the present disclosure only, and the embodiments of the present disclosure may be embodied in various forms and are limited to the embodiments described herein. It is to be understood that the present disclosure includes all modifications, equivalents, and alternatives falling within the spirit and scope of the present disclosure.

Also, portions irrelevant to the description of the present disclosure will be omitted in the drawings for a clear description of the present disclosure, and like reference numerals will denote like elements throughout the specification.

The terms used herein are for the purpose of describing particular embodiments only and are not intended to limit the spirit and scope of the present disclosure. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms (including technical and scientific terms) used herein may have the same meaning as commonly understood by those of ordinary skill in the art to which the present disclosure belongs. It will also be understood that terms such as those defined in commonly-used dictionaries should be interpreted as having a meaning that is consistent with their meaning in the context of the relevant art and will not be interpreted in an idealized or overly formal sense unless expressly so defined herein.

Also, as used herein, the terms "units" and "modules" may refer to units that perform at least one function or operation, and the units may be implemented as hardware or software or a combination of hardware and software.

Herein, the term "translation target content" may refer to content that is constructed in a first language and is to be translated into a second language. For example, the "translation target content" may include at least one of words, corpuses, phrases, morphemes, sentences, and word orders that are constructed in the first language. In an embodiment, the "translation target content" may be implemented in text or speech.

Herein, the term "translated content" may refer to content that is translated into the second language from the translation target content constructed in the first language. For example, the "translated content" may include at least one of words, corpuses, phrases, morphemes, sentences, and word orders that are constructed in the second language. In an embodiment, the "translated content" may be implemented in text or speech.

For example, the "translation target content" may be a sentence constructed in Korean, and the term "translated content" may be a sentence translated from Korean into English.

Herein, a "graphical user interface (GUI)" may be displayed on a display screen of a device and may include at least one of objects including icons, texts, sounds, images, virtual buttons, and background images that may be selected by users.

FIG. 1 is a conceptual diagram illustrating a method of collecting translated content by a translation server 100, according to an embodiment of the present disclosure.

Referring to FIG. 1, the translation server 100 may be connected to a plurality of devices 200-1 to 200-4 through a network.

The translation server 100 may include a machine translator and a database. The machine translator may machine-translate translation target content constructed in a first language into translated content constructed in a second language and provide the translation result to the devices 200-1 to 200-4 of users through the network. However, the present disclosure is not limited thereto, and the translation server 100 may translate the translation target content into a third language and provide the translation result to the devices 200-1 to 200-4 of the users. The machine translator may include, for example, statistical machine translation (SMT) or rule-based machine translation (RBMT). The database may store the translation target content constructed in the first language and the translated content constructed in the second language.

The plurality of devices 200-1 to 200-4 may be computing devices that may connect to the translation server 100 through the network. For example, the plurality of devices 200-1 to 200-4 may be devices including at least one of a mobile phone, a smart phone, a personal computer (PC), and a tablet computer.

The network may include any communication capable of exchanging data by wire/wireless such as wired/wireless Internet service, local area network (LAN), wide area network (WAN), intranet, mobile computing service, wireless data communication service, satellite communication service, and/or Bluetooth. For example, when the network is connected to a mobile phone or a tablet computer, the network may be a wireless data communication service such as 3G or long term evolution (LTE), a wireless LAN such as Wi-Fi, and/or Bluetooth.

The translation server 100 may provide translation target content according to a translation request category to a plurality of users (users 1 to 4) using the plurality of devices 200-1 to 200-4. The translation request category may be determined according to the translation target content that is to be collected by the translation server 100. In an embodiment, the translation request category may include at least one of a direct translation request category, a translated content verification category, an education content provision category, an audiovisual content provision category, and a game content provision category.

The translation server 100 may receive translated content from the plurality of users (users 1 to 4) using the plurality of devices 200-1 to 200-4. In an embodiment, by using the plurality of devices 200-1 to 200-4, the plurality of users (users 1 to 4) may access the translation server 100 and transmit the translation target content provided according to the translation request category. The translated content may be different according to the translation request category. For example, the translation server 100 may acquire the translated content obtained by translating at least one of corpuses, coined words, acronyms, proper nouns, technical terms, and dialogues constructed in the first language from the plurality of users (users 1 to 4).

The translation server 100 may update the database of the translation server 100 based on the translated content received from the plurality of users (users 1 to 4). The translation server 100 may compare prestored translated content with new translated content received from the plurality of users (users 1 to 4), verify the reliability of the new translated content, and update the translated content prestored in the database. The updated translated content may include at least one of words, corpuses, phrases, sentences, and word orders that are constructed in the second language.

The translation server 100 may provide rewards to the plurality of users (users 1 to 4) providing the translated content through the plurality of devices 200-1 to 200-4. The rewards may include points or equivalent goods that the plurality of users (users 1 to 4) may use on the Internet or offline. For example, the rewards may include at least one of points, coupons, movie tickets, and lecture vouchers.

In order to improve a translation rate, the translation server 100 providing a translation service may use a crowd sourcing method for collecting translated content from a plurality of users connected to the translation server 100.

In the embodiment illustrated in FIG. 1, the translation server 100 may provide a crowd sourcing translation service for collecting translated content from a group through a simple and interesting translation request category for inducing participation in translation by a crowd including the plurality of users (users 1 to 4) using the plurality of devices 200-1 to 200-4. Also, the translation server 100 may increase a translation participation rate of the plurality of users (users 1 to 4) by providing rewards to the plurality of users (users 1 to 4) providing the translated content. Also, the translation server 100 may improve the quality of translation by updating the database based on the translated content collected from the plurality of users (users 1 to 4). As a circulation structure, the translation server 100 may acquire translated content from the plurality of users (users 1 to 4), the plurality of users (users 1 to 4) may receive rewards, and the plurality of users (users 1 to 4) receiving the rewards may provide translated content to the translation server 100 again.

FIG. 2 is a flowchart illustrating a method of collecting translated content by the translation server 100, according to an embodiment of the present disclosure.

In operation S210, the translation server 100 may determine translation target content. The translation server 100 may determine translated content to be received from a plurality of users and stored in the database of the translation server 100, according to a predetermined criterion. For example, the translation server 100 may be set to preferentially determine, as a translation target, a translation pair in which the translated content is less than a predetermined number in comparison with the translation target content among the translation pairs including the translated content and the translation target content stored in the database. In an embodiment, the translation server 100 may select at least one of corpuses, coined words, acronyms, proper nouns, technical terms, and dialogues as translation target content according to a predetermined criterion.

In operation S220, the translation server 100 may determine a translation request category for requesting translation of the determined translation target content. The translation server 100 may select at least one of a plurality of translation request categories. In an embodiment, the translation request category may include at least one of a direct translation request category for requesting direct translation from a plurality of users, a translated content verification category for requesting a plurality of users to verify pre-translated content, an education content provision category for providing education content to a plurality of users and requesting to provide translated content in the education content, an audiovisual content provision category for providing audiovisual content such as movies or music and requesting a plurality of users to provide translated content in the audiovisual content, and a game content provision category for providing game content and requesting a plurality of users to provide translated content in the game content. In an embodiment, the translation request category may be set individually according to the translation target content determined in operation S210. For example, in order to acquire translated content constructed in a second language with respect to coined words constructed in a first language, the translation server 100 may determine the coined words constructed in the first language as the translation target content in operation S210 and select at least one of the direct translation request category, the audiovisual content provision category, and the game content provision category in operation S220. A detailed description thereof will be given below in the description of FIG. 4.

In operation S230, the translation server 100 may provide a translation request GUI corresponding to the determined translation request category to at least one device connected to the translation server 100. For example, the at least one device may include at least one of a mobile phone, a smart phone, a PC, and a tablet computer. The at least one device may be connected to the translation server 100 through the network by wire or wireless.

The translation server 100 may provide the translation request GUI to the at least one device through the network. The translation request GUI may be provided as a predetermined type according to the translation request category determined in operation S220. The translation request GUI may be different according to the determined translation request category. For example, the GUI provided to the at least one device may be different with respect to each of the case where the translation server 100 selects the translated content verification category and the case where the translation server 100 selects the audiovisual content provision category in operation S220. For example, when the translation server 100 selects the audiovisual content provision category in operation S220, the translation server 100 may provide audiovisual content such as music or movies through the network and provide a GUI for requesting the user to provide translated content about translation target content included in music lyrics or movie dialogues. A detailed description thereof will be given below in the description of FIGS. 3A to 3H.

The translation request GUI may include a translation request message corresponding to the determined translation request category. The translation request message may be a message for requesting the users using the plurality of devices 200-1 to 200-4 to input a translation of the translation target content. The users using the plurality of devices 200-1 to 200-4 may input translated content through the translation request GUI, and the translated content may be input and stored in the plurality of devices 200-1 to 200-4. The plurality of devices 200-1 to 200-4 may transmit the input translated content to the translation server 100 through the network.

In operation S240, the translation server 100 may acquire the translated content from the at least one device. The translation server 100 may acquire the translated content input by at least one user of the at least one device. In an embodiment, the translation server 1000 may acquire at least one of untranslated words, coined words, acronyms, proper nouns, synonyms, homonyms, corpuses, phrases, and word orders constructed in the second language.

FIGS. 3A to 3H are diagrams illustrating an example of a GUI for providing, by the translation server 100, a translation request category to a device 200 connected to the translation server 100 through a network and collecting translated content according to the translation request category, according to an embodiment of the present disclosure.

The GUI illustrated in FIGS. 3A to 3H corresponds to an example of a case where a translation application is executed in the device 200, and the GUI provided to the device 200 by the translation server 100 is not limited to FIGS. 3A to 3H. Also, although the device 200 illustrated in FIGS. 3A to 3H is illustrated as a mobile phone or a smart phone, it is not limited thereto and may include any device such as a PC or a tablet computer that may be connected to the translation server 100 through a network.

Figure 3A:
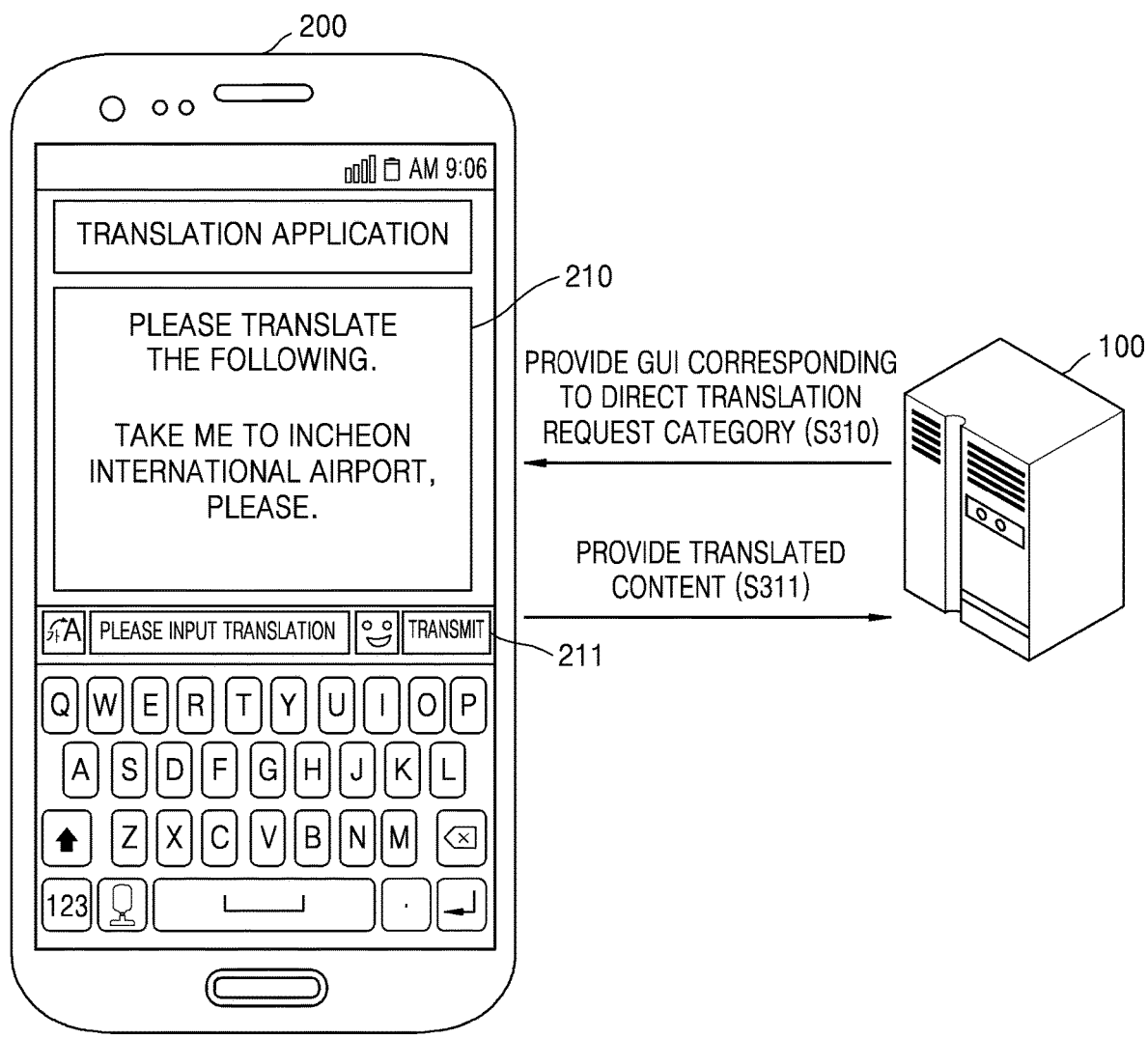
FIGS. 3A to 3H are diagrams illustrating a method by which a translation server provides a translation request category to a device connected to the translation server through a network and collects translated content according to the translation request category, according to an embodiment of the present disclosure.

FIG. 3A is a diagram illustrating a GUI corresponding to a direct translation request category.

In operation S310, the translation server 100 may provide the device 200 with a GUI corresponding to a direct translation request category. The direct translation request category may be a category for directly requesting the user of the device 200 to translate the translation target content constructed in the first language.

The device 200 may display a translation request GUI 210 received from the translation server 100 on a display screen. The translation request GUI 210 may include a word or a sentence constructed in the first language (English in FIG. 3A). Also, the translation request GUI 210 may include a translated content input GUI 211 for allowing the user of the device 200 to translate the translation target content constructed in the first language into the second language and transmit the translation result to the translation server 100. The user may input the translated content translated from the translation target content into the second language through the translated content input GUI 211 displayed on the device 200.

In operation S311, the device 200 may provide the translated content to the translation server 100. In an embodiment, the translation server 100 may acquire the translated content provided from the device 200 through the network.

Figure 3B:
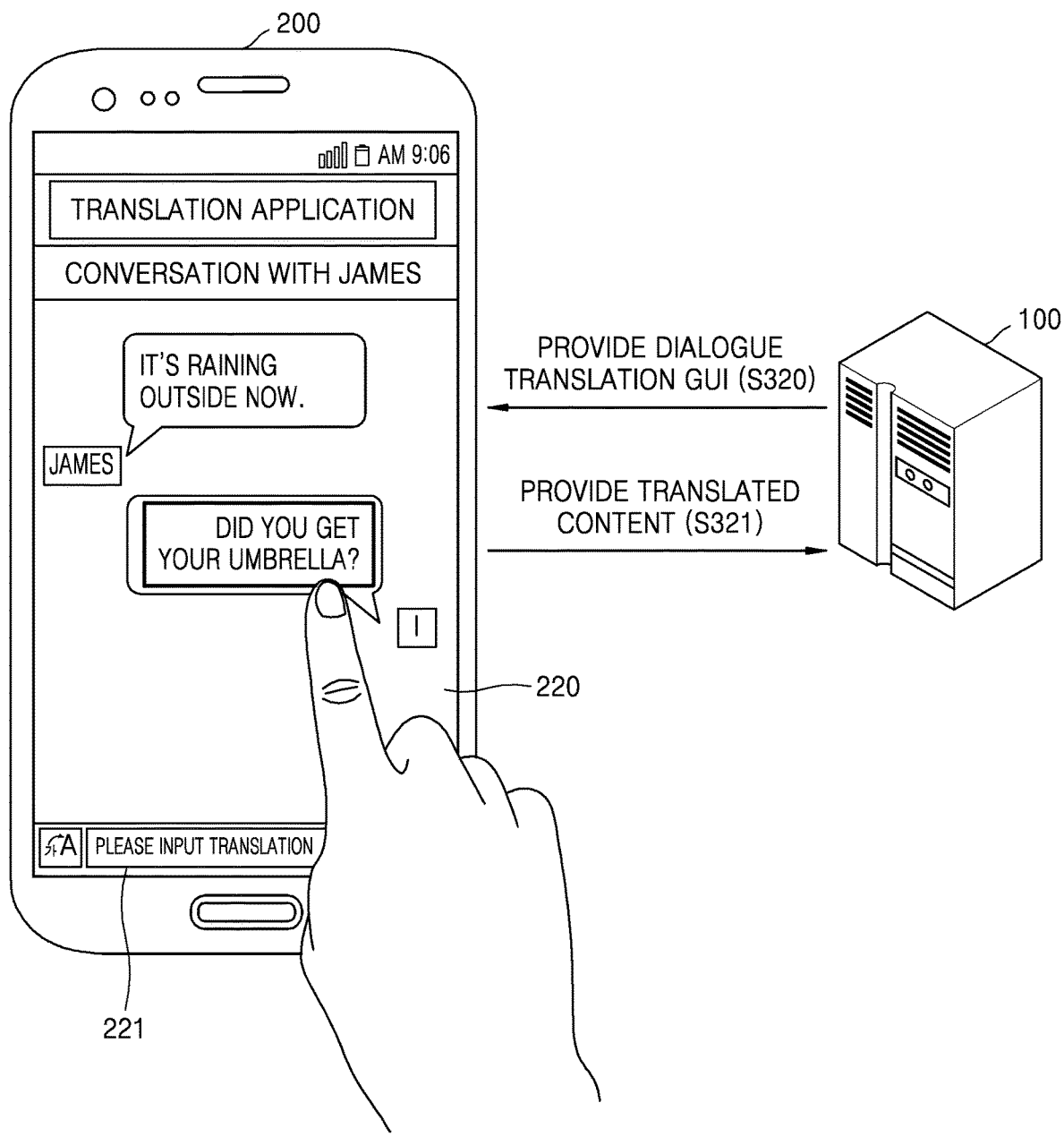

FIG. 3B is a diagram illustrating a dialogue translation GUI corresponding to a direct translation request category.

In operation S320, the translation server 100 may provide a dialogue translation GUI to the device 200. In an embodiment, the translation server 100 may provide the device 200 with a dialogue translation GUI for requesting the users to translate dialogues or words of the first language into the second language on a messenger application executed in the device 200. The dialogue translation GUI may be a GUI corresponding to the direct translation request category.

A messenger application GUI 220 may be displayed on the display screen of the device 200, in which a plurality of users may input conversations with each other. The messenger application GUI 220 may display a dialogue or word constructed in the first language (Korean in FIG. 3B). Also, the messenger application GUI 220 may include a translated content input GUI 221 for allowing the user of the device 200 to translate the dialogue or word constructed in the first language into the second language and transmit the translation result to the translation server 100. The user may input the translated content translated from the translation target content including the dialogue or word into the second language through the translated content input GUI 221 displayed on the device 200. In an embodiment, the device 200 may receive a user input for selecting a sentence or word to be translated, among the dialogues or words displayed in the messenger application GUI 220.

In operation S321, the device 200 may provide the translated content to the translation server 100. In an embodiment, the translation server 100 may acquire the translated content translated from the dialogue or word into the second language and provided from the device 200 through the network.

Figure 3C:
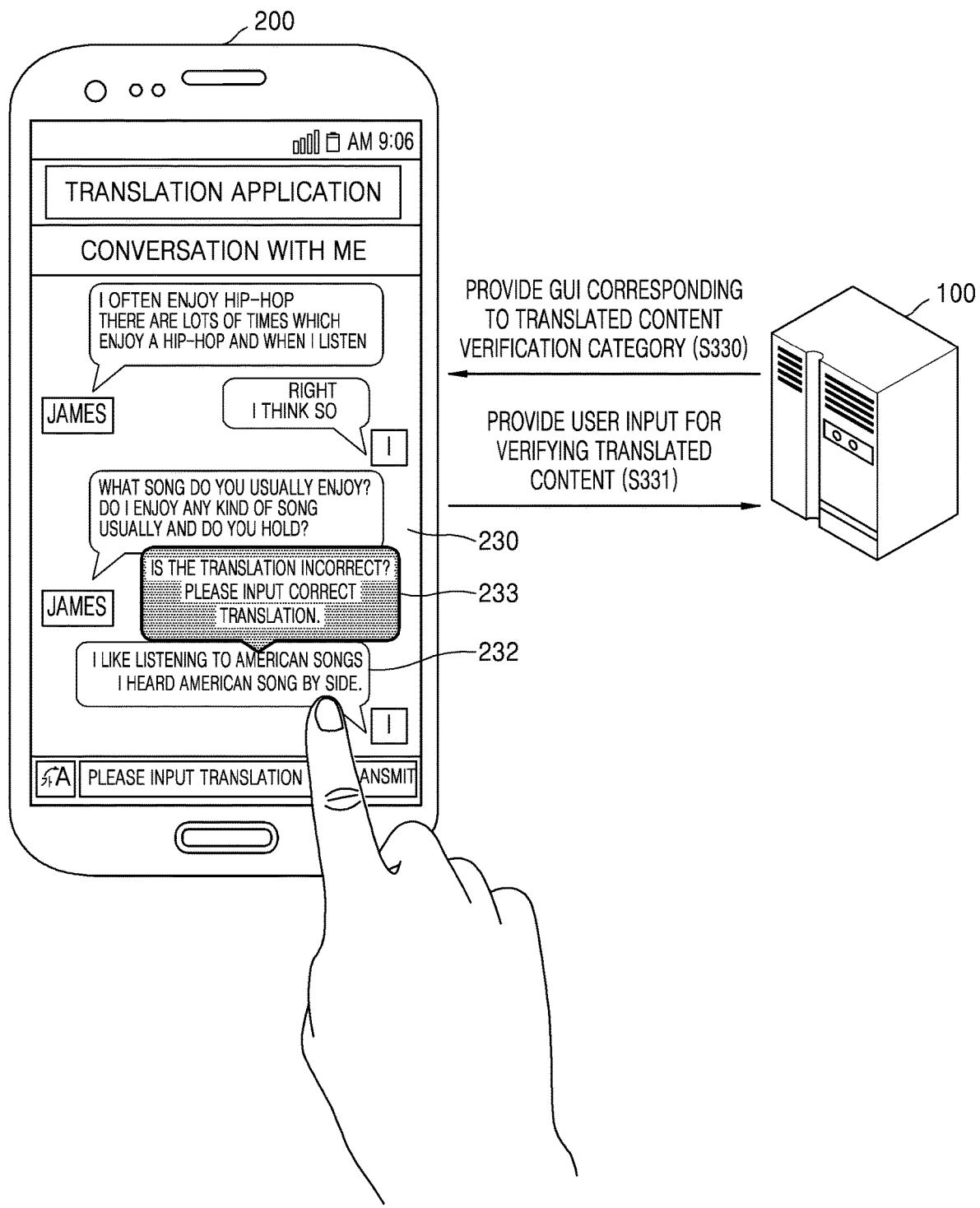

FIG. 3C is a diagram illustrating a GUI corresponding to a translated content verification category.

In operation S330, the translation server 100 may provide the device 200 with a GUI corresponding to a translated content verification category. The translated content verification category may be a category for providing a combination of the translation target content constructed in the first language and the translated content translated from the translation target content into the second language and acquiring a user input for determining whether the provided translated content is a correct translation of the translation target content.

In an embodiment, a translation verification GUI 230 provided with a combination of the translation target content including dialogues or words and the translated content thereof may be displayed on the display screen of the device 200. The translation verification GUI 230 may display a combination of the dialogue or word constructed in the first language (Korean in FIG. 3C) and the sentence or word translated from the dialogue or word into the second language (English in FIG. 3C). Also, the device 200 may receive a user input for selecting a sentence or word for verifying whether the translated content provided through the translation verification GUI 230 is a correct translation of the translation target content. In an embodiment, the device 200 may receive a user input for selecting a verification target sentence 232 among a plurality of dialogues displayed on the display screen. When the device 200 receives the user input, the translation verification GUI 230 may display a speech balloon GUI 233 for asking the suitability of the translation and requesting the input of a correct translation. The speech balloon GUI 233 may be displayed at a position adjacent to the verification target sentence 232 selected by the user. In an embodiment, when receiving a user input for selecting the speech balloon GUI 233, the device 200 may display a GUI for evaluating the suitability of the translation and inputting a correct translation when the translation is incorrect.

In operation S331, the device 200 may provide the translation server 100 with a user input for verifying the translated content. In an embodiment, the device 200 may transmit an alternative translation input and/or a translated content verification input entered through the speech balloon GUI 233 to the translation server 100. The translation server 100 may acquire the alternate translation input and/or the translated content verification input transmitted from the device 200 through the network.

Figure 3D:
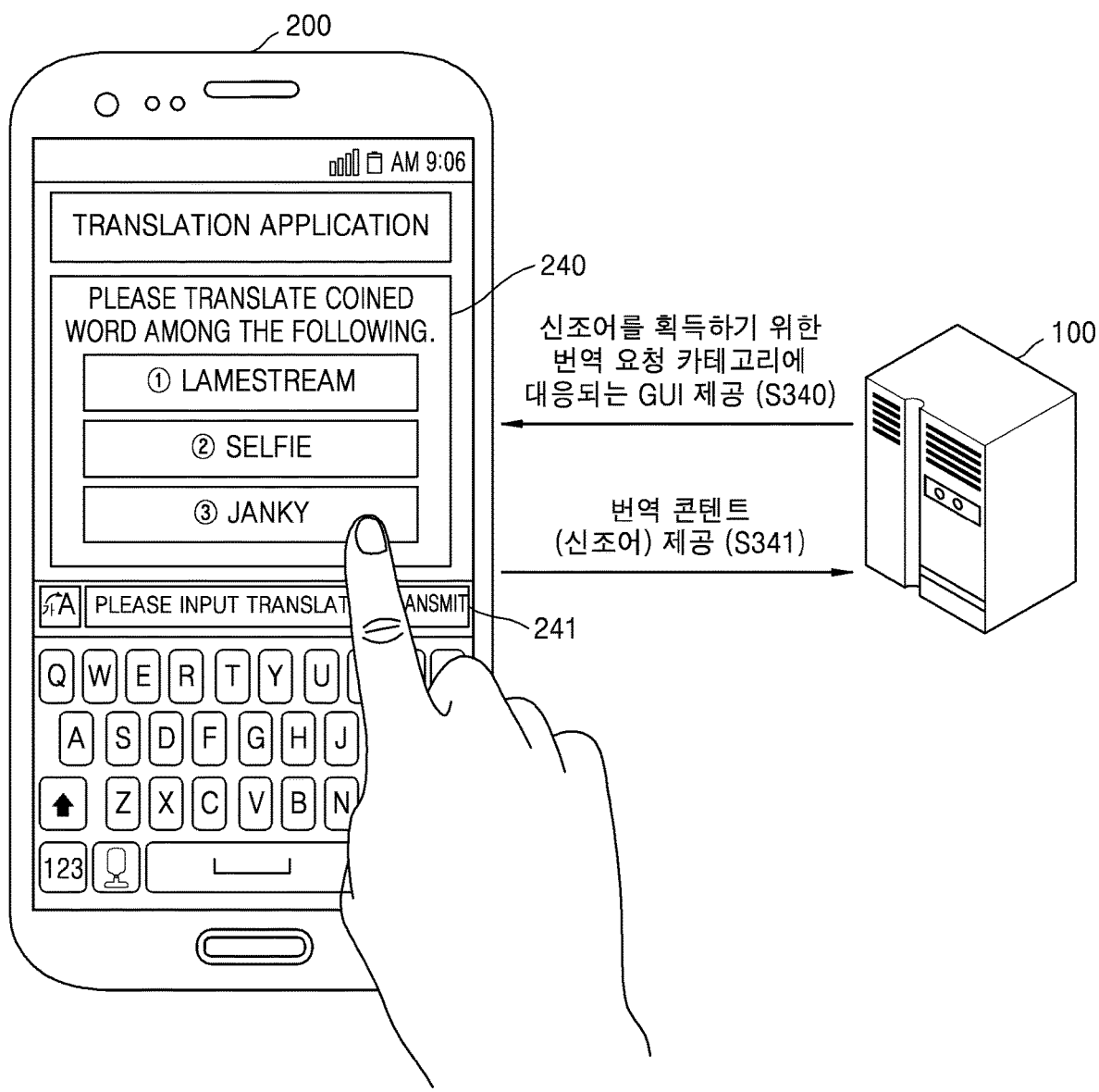

FIG. 3D is a diagram illustrating a GUI corresponding to a translation request category for acquiring a coined word.

In operation S340, the translation server 100 may provide the device 200 with a GUI corresponding to a translation request category for acquiring a coined word. The translation server 100 may provide the device 200 with a GUI for acquiring the translated content translated into the second language from the coined word among the translation target content constructed in the first language.

In an embodiment, a coined word translation request GUI 240 for selecting the coined word constructed in the first language (English in FIG. 3D) and translating the selected coined word into the second language may be displayed on the display screen of the device 200. The coined word translation request GUI 240 may display at least one coined word constructed in the first language on the display screen of the device 200. In an embodiment, the device 200 may receive a user input for selecting any one of the at least one coined word through the coined word translation request GUI 240. The coined word translation request GUI 240 may include a translated content input GUI 241 for receiving the translated content translated into the second language from the coined word selected by the user input from the user.

In operation S341, the device 200 may provide the translation server 100 with the translated content translated into the second language from the coined word. In an embodiment, the device 200 may transmit the translated content of the coined word received through the translated content input GUI 241 to the translation server 100. The translation server 100 may acquire the translated content of the coined word from the device 200 through the network.

Figure 3E:
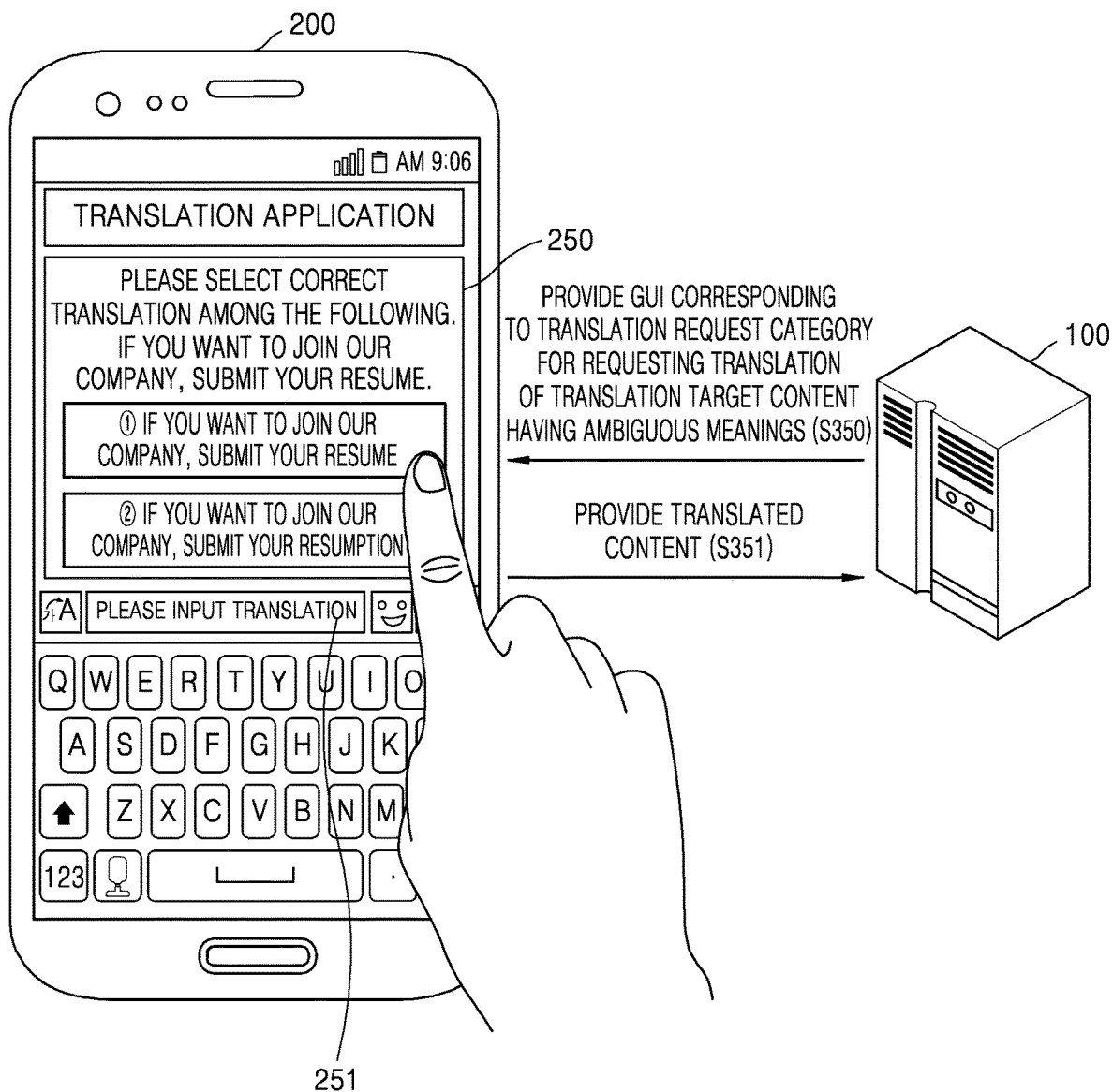

FIG. 3E is a diagram illustrating a GUI corresponding to a translation request category for requesting translation of translation target content having ambiguous meanings.

In operation S350, the translation server 100 may provide the device 200 with a GUI corresponding to a translation request category for requesting the translation of the translation target content having ambiguous meanings. The translation server 100 may provide the device 200 with a GUI for acquiring the translated content translated into the second language (Korean in FIG. 3E) from the sentence or word ("resume" in FIG. 3E) having ambiguous meanings among the translation target content constructed in the first language (English in FIG. 3E).

An ambiguous meaning translation request GUI 250 for displaying a sentence including a word constructed in the first language and having ambiguous meanings may be displayed on the display screen of the device 200. The ambiguous meaning translation request GUI 250 may display the example translated content translated into the second language with respect to the displayed sentence. The device 200 may receive a user input for selecting the translated content that is more suitably translated in light of the sentence from the word having ambiguous meanings among the example translated content through the ambiguous meaning translation request GUI 250. In an embodiment, the ambiguous meaning translation request GUI 250 may include a translated content input GUI 251 for allowing the user to input a suitable translation of the translation target content having ambiguous meanings.

In operation S351, the device 200 may provide the translation server 100 with the translated content translated into the second language from the translation target content having ambiguous meanings. The device 200 may transmit the translated content acquired based on the user input for selecting any one of the example translated content displayed through the ambiguous meaning translation request GUI 250 to the translation server 100. In an embodiment, the device 200 may transmit the translated content received from the user through the translated content input GUI 251 to the translation server 100. The translation server 100 may acquire the translated content of the translation target content having ambiguous meanings from the device 200 through the network.

Figure 3F:
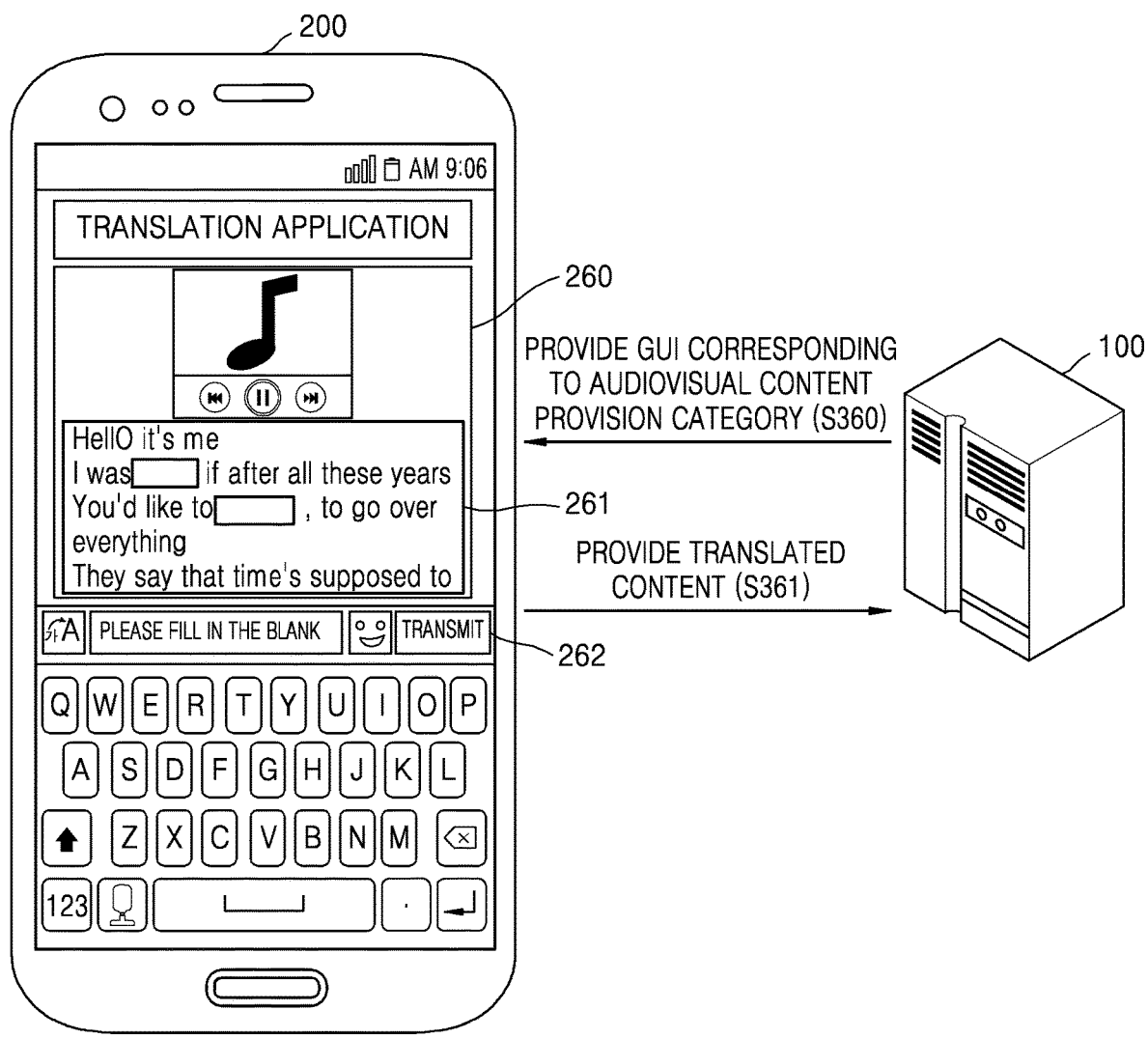

FIG. 3F is a diagram illustrating a GUI corresponding to an audiovisual content provision category.

In operation S360, the translation server 100 may provide the device 200 with the audiovisual content including the translation target content constructed in the first language (English in FIG. 3F). In an embodiment, the translation server 100 may provide the device 200 with a GUI for receiving music content and a user input filling the blanks of the lyrics constructed in the first language and included in the music content.

The device 200 may display an audiovisual content provision GUI 260 for reproducing the music content received from the translation server 100. The audiovisual content provision GUI 260 may include a lyric display GUI 261 for displaying the lyrics included in the music content played in the device 200 on the display screen. The lyric display GUI 261 may not include all of the lyrics included in the music content and may include blanks in the lyrics. In an embodiment, the audiovisual content provision GUI 260 may include a translated content input GUI 262 for receiving a user input for inputting the lyrics into the blanks displayed in the lyric display GUI 261. The translated content input GUI 262 may receive a user input for inputting the same language (i.e., the first language) as in the lyrics included in the music played in the device 200, but is not limited thereto. In an embodiment, the translated content input GUI 262 may receive a user input for inputting the translated content translated into the second language from the lyrics constructed in the first language and included in the music content.

In operation S361, the device 200 may provide the translation server 100 with the translated content input by the user with respect to the omitted lyrics included in the played music content, that is, the blanks of the lyric display GUI 261. In an embodiment, the device 200 may transmit the blank input or the translated content received from the user through the translated content input GUI 262 to the translation server 100. The translation server 100 may acquire the translated content for the blanks or the blank input for the lyrics included in the music content from the device 200 through the network.

Figure 3G:
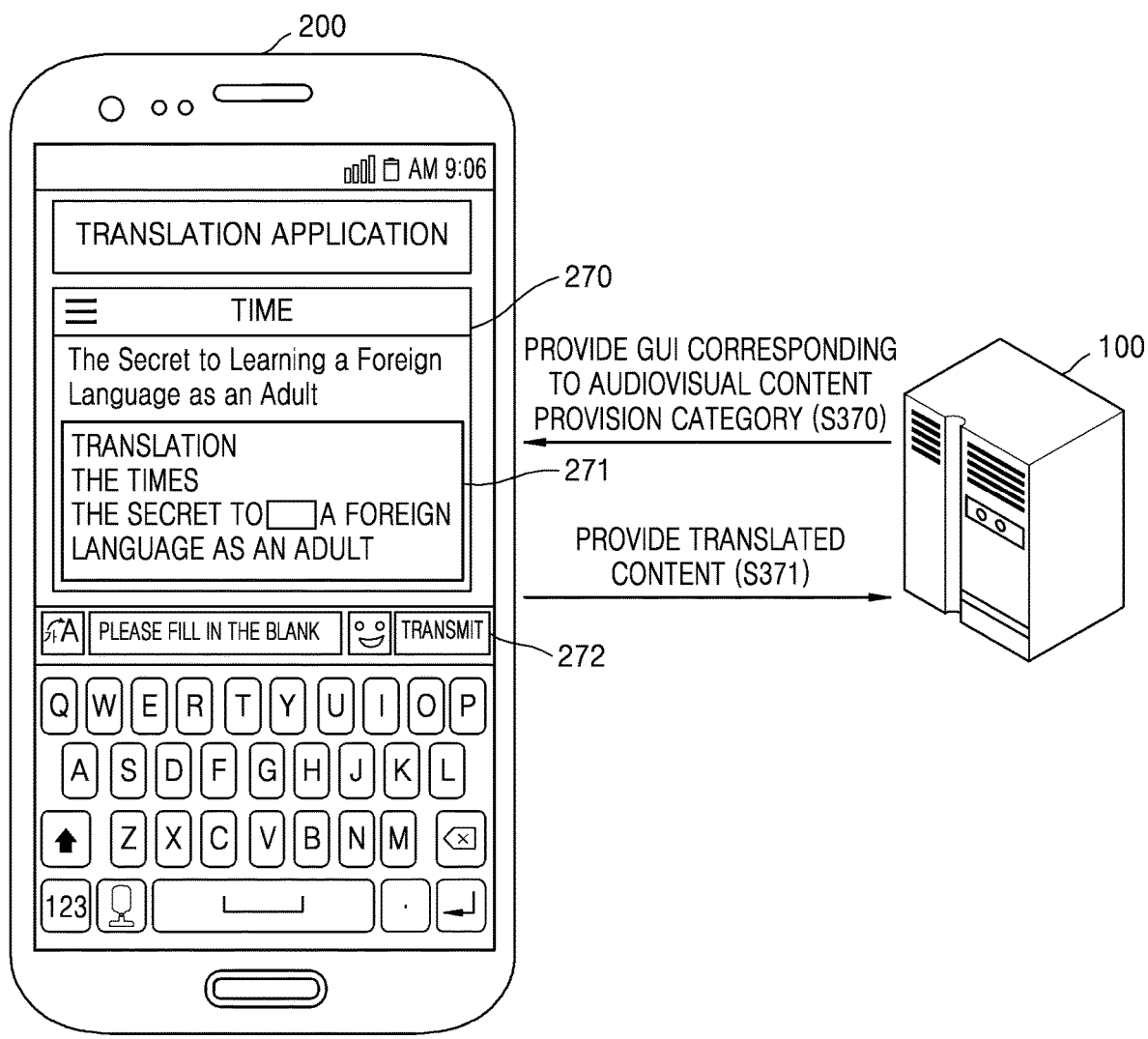

FIG. 3G is a diagram illustrating a GUI corresponding to an audiovisual content provision category.

In operation S370, the translation server 100 may provide the device 200 with the audiovisual content including the translation target content constructed in the first language (English in FIG. 3G) and the translated content constructed in the second language (Korean in FIG. 3G). In an embodiment, the translation server 100 may provide the device 200 with a GUI including a newspaper article constructed in the first language and an article translation obtained by translating the newspaper article into the second language.

The device 200 may display an audiovisual content provision GUI 270 including the article translation and the newspaper article received from the translation server 100. The audiovisual content provision GUI 270 may include a newspaper article constructed in the first language displayed on the display screen of the device 200. The audiovisual content provision GUI 270 may include an article translation GUI 271 translated into the second language from the newspaper article. The article translation GUI 271 may not display all of the article translation translated into the second language from the newspaper article and may include blanks in the article translation. In an embodiment, the audiovisual content provision GUI 270 may include a translated content input GUI 272 for receiving a user input for inputting the article translation into the blanks displayed in the article translation GUI 271.

In operation S371, the device 200 may receive the translated content corresponding to the blank omitted in the article translation translated from the newspaper article into the second language from the user and provide the received translated content to the translation server 100. In an embodiment, the device 200 may transmit the translated content received from the user through the translated content input GUI 272 to the translation server 100. The translation server 100 may acquire the translated content untranslated and omitted in the article translation from the device 200 through the network.

Figure 3H:
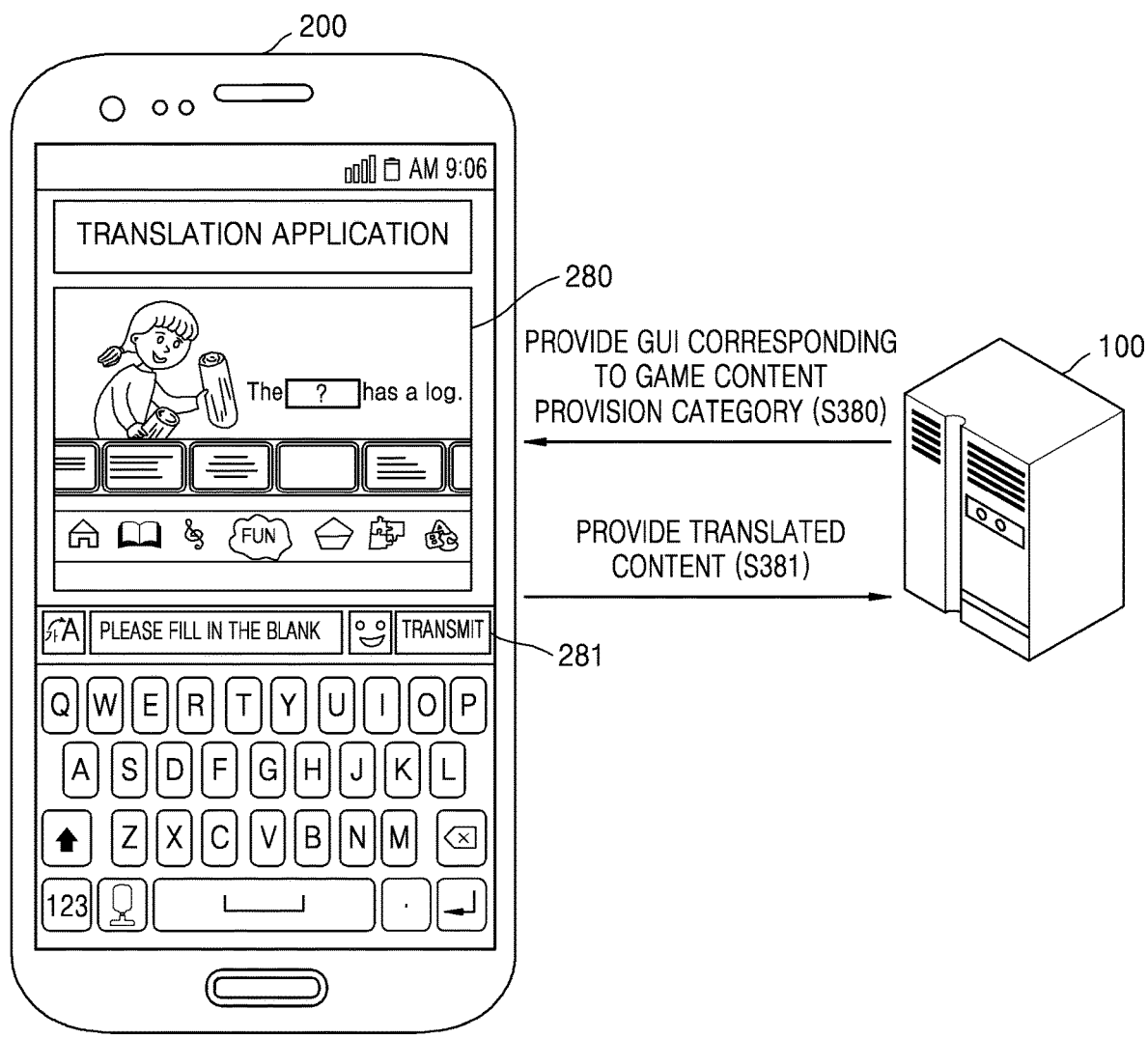

FIG. 3H is a diagram illustrating a GUI corresponding to a game content provision category.

In operation S380, the translation server 100 may provide the device 200 with the game content including the translation target content constructed in the first language (English in FIG. 3G). In an embodiment, the game content provided to the device 200 may be a game of matching sentences or words constructed in the first language. In an embodiment, the translation server 100 may provide the device 200 with a GUI including the game content of matching the sentences or words constructed in the first language.

The device 200 may display a game content provision GUI 280 received from the translation server 100. The game content provision GUI 280 may include a sentence or word constructed in the first language displayed on the display screen of the device 200. The game content provision GUI 280 may include a translated content input GUI 281 for receiving a user input for inputting a blank in the sentence or word constructed in the first language while playing the game. The translated content input GUI 281 may receive a user input for inputting an omitted sentence or word by hearing or watching the first language provided in the game while playing the game. However, the present disclosure is not limited thereto, and the translated content input GUI 281 may receive a user input for inputting the translated content translated into the second language from a sentence or word corresponding to an omitted portion (i.e., blank) in the game content constructed in the first language.

In operation S381, the device 200 may provide the translation server 100 with the translated content input by the user with respect to the blank of the translated content input GUI 281, that is, the omitted sentence or word in the played game content constructed in the first language. In an embodiment, the device 200 may transmit the blank input or the translated content received from the user through the translated content input GUI 281 to the translation server 100. The translation server 100 may acquire the translated content for the blank or the blank input for matching the sentence or word included in the game content from the device 200 through the network.

FIG. 4 is a diagram illustrating a type of translated content 420 that may be collected according to a translation request category 400 provided by the translation server 100, according to an embodiment of the present disclosure.

Referring to FIG. 4, the translation request category 400 provided to the device 200 by the translation server 100 may include a direct translation request category 411, a translated content verification category 412, an education content provision category 413, an audiovisual content provision category 414, and a game content provision category 415. However, the translation request category 400 is not limited to that illustrated in FIG. 4.

The direct translation request category 411 may be a category by which the translation server 100 provides the translation target content to the user of the device 200 and directly requests the user to translate the translation target content. The direct translation request category 411 may include a translation input category 411-1 and a translation correction category 411-2. The translation input category 411-1 may be a category by which the translation server 100 provides the translation target content to the user of the device 200 and requests the user to input the translated content thereof. The translation correction category 411-2 may be a category by which the translation server 100 provides a combination of the translation target content and the translated content thereof to the user of the device 200 and requests the user to correct the translated content when the translated content is not suitable for the translation target content.

Through the direct translation request category 411, the translation server 100 may acquire the translated content 420 including at least one of untranslated word 420-1, coined word 420-2, acronym 420-3, proper noun 420-4, synonym 420-5, homonym 420-6, single corpus 420-7, corpus pair 420-8, phrase 420-9, and word order 420-10. In an embodiment, the translation server 100 may provide a GUI corresponding to the translation input category 411-1 to the device 200 and acquire the translated content 420 of at least one of the untranslated word 420-1, the coined word 420-2, the acronym 420-3, the proper noun 420-4, the synonym 420-5, the homonym 420-6, the single corpus 420-7, and the corpus pair 420-8 from the user of the device 200. In an embodiment, the translation server 100 may provide a GUI corresponding to the translation correction category to the device 200 and acquire the translated content 420 of at least one of the untranslated word 420-1, the coined word 420-2, the acronym 420-3, the proper noun 420-4, the synonym 420-5, the homonym 420-6, the single corpus 420-7, the corpus pair 420-8, the phrase 420-9, and the word order 420-10 from the user of the device 200.

The translated content verification category 412 may be a category by which the translation server 100 requests a user input for verifying whether the translated content acquired from the device 200 or the translated content translated by the machine translator of the translation server 100 is a suitable translation of the translation target content. The translated content verification category 412 may include a translation score evaluation category 412-1 and a translation selection category 412-2. The translation score evaluation category 412-1 may be a category by which the translation server 100 provides a combination of the translation target content and the translated content to the device 200 and requests the user of the device 200 to verify whether the translated content is a suitable translation of the translation target content and evaluate a score thereof. The translation selection category 412-2 may be a category by which the translation server 100 provides the translation target content and a plurality of translated content thereof to the user of the device 200 and requests the user to select the most suitable translated content for the translation target content among the plurality of translated content.

Through the translated content verification category 412, the translation server 100 may acquire the translated content 420 including at least one of the single corpus 420-7, the corpus pair 420-8, and the phrase 420-9. In an embodiment, the translation server 100 may provide a GUI corresponding to the translation selection category 412-2 to the device 200 and acquire the translated content 420 of at least one of the single corpus 420-7, the corpus pair 420-8, and the phrase 420-9 from the user of the device 200. In an embodiment, even by providing the GUI corresponding to the translation score evaluation category 412-1 to the device 200, the translation server 100 may not acquire the translated content but may acquire translation rate evaluation information.

The education content provision category 413 may be a category by which the translation server 100 provides the education content constructed in the first language (e.g., English) to the user of the device 200 and requests the user to translate the translation target content included in the education content. The education content provision category 413 may include a blank filling category 413-1 and a reading/grammar/pronunciation learning category 413-2. The blank filling category 413-1 may be a category by which the translation server 100 shows or tells the user (e.g., student) of the device 200 the education content for learning words, sentences, or expressions frequently used in a first language (e.g., English) proficiency test such as OPIC (Oral Proficiency Interview by Computer) or HSK (Chinese Proficiency Test) and requests the user to take a dictation or fill an omitted portion of the translation target content included in the education content. The reading/grammar/pronunciation learning category 413-2 may be a category by which the translation server 100 provides the user (e.g., student) of the device 200 with the learning content for learning the reading/grammar/pronunciation.

Through the education content provision category 413, the translation server 100 may acquire the translated content including the synonym 420-5. In an embodiment, the translation server 100 may provide the device 200 with a synonym learning GUI for presenting a sentence or word constructed in the first language and acquire a sentence or word having a similar meaning to the sentence or word constructed in the first language from the user of the device 200.

The audiovisual content provision category 414 may be a category by which the translation server 100 provides the audiovisual content including music, movies, cartoons, and newspaper articles to the user of the device 200 and requests the user to translate the translation target content included in the audiovisual content. The audiovisual content provision category 414 may include a music/movie provision category 414-1 and a newspaper article provision category 414-2. The music/movie provision category 414-1 may be a category by which the translation server 100 provides the music or movie to the user of the device 200 and requests the user to input the translated content of the translation target content included in the music or movie, for example, the lyrics of the music or the dialogues of the movie. The newspaper article provision category 414-2 may be a category by which the translation server 100 provides a combination of the newspaper article and the translation thereof to the user of the device 200 and requests the user to fill an omitted portion (e.g., blank) in the translation of the newspaper article.

Through the audiovisual content provision category 414, the translation server 100 may acquire the translated content 420 including at least one of the untranslated word 420-1, the coined word 420-2, the acronym 420-3, the proper noun 420-4, the synonym 420-5, and the homonym 420-6. In an embodiment, the translation server 100 may provide a GUI corresponding to the music/movie provision category 414-1 to the device 200 and acquire the translated content 420 of at least one of the untranslated word 420-1, the coined word 420-2, the acronym 420-3, the proper noun 420-4, the synonym 420-5, and the homonym 420-6 from the user of the device 200. In an embodiment, the translation server 100 may provide a GUI corresponding to the newspaper article provision category 414-2 to the device 200 and acquire the translated content 420 of at least one of the untranslated word 420-1, the coined word 420-2, the acronym 420-3, the proper noun 420-4, the synonym 420-5, and the homonym 420-6 from the user of the device 200.

The game content provision category 415 may be a category by which the translation server 100 provides the game content to the user of the device 200 and requests the user to translate the translation target content included in the game content. The game content provision category 415 may include a picture title game category 415-1 and a word puzzle game category 415-2. The picture title game category 415-1 may be a category by which the translation server 100 provides the game content including a picture to the user of the device 200 and requests the user to input the title of the picture in the first language. The word puzzle game category 415-2 may be a category by which the translation server 100 provides the user of the device 200 with the game content including at least one of picture, image, and music or the translated content constructed in the first language and requests the user to input the word suitable for at least one of the picture, the image, and the music or the translation target content.

Through the game content provision category 415, the translation server 100 may acquire the translated content 420 including at least one of the untranslated word 420-1, the coined word 420-2, the acronym 420-3, the proper noun 420-4, the synonym 420-5, the single corpus 420-7, and the corpus pair 420-8. In an embodiment, the translation server 100 may provide a GUI corresponding to the picture title game category 415-1 to the device 200 and acquire the single corpus 420-7 from the user of the device 200. In an embodiment, the translation server 100 may provide a GUI corresponding to the word puzzle game category 415-2 to the device 200 and acquire the translated content 420 of at least one of the untranslated word 420-1, the coined word 420-2, the acronym 420-3, the proper noun 420-4, the synonym 420-5, the single corpus 420-7, and the corpus pair 420-8 from the user of the device 200.

Figure 5:
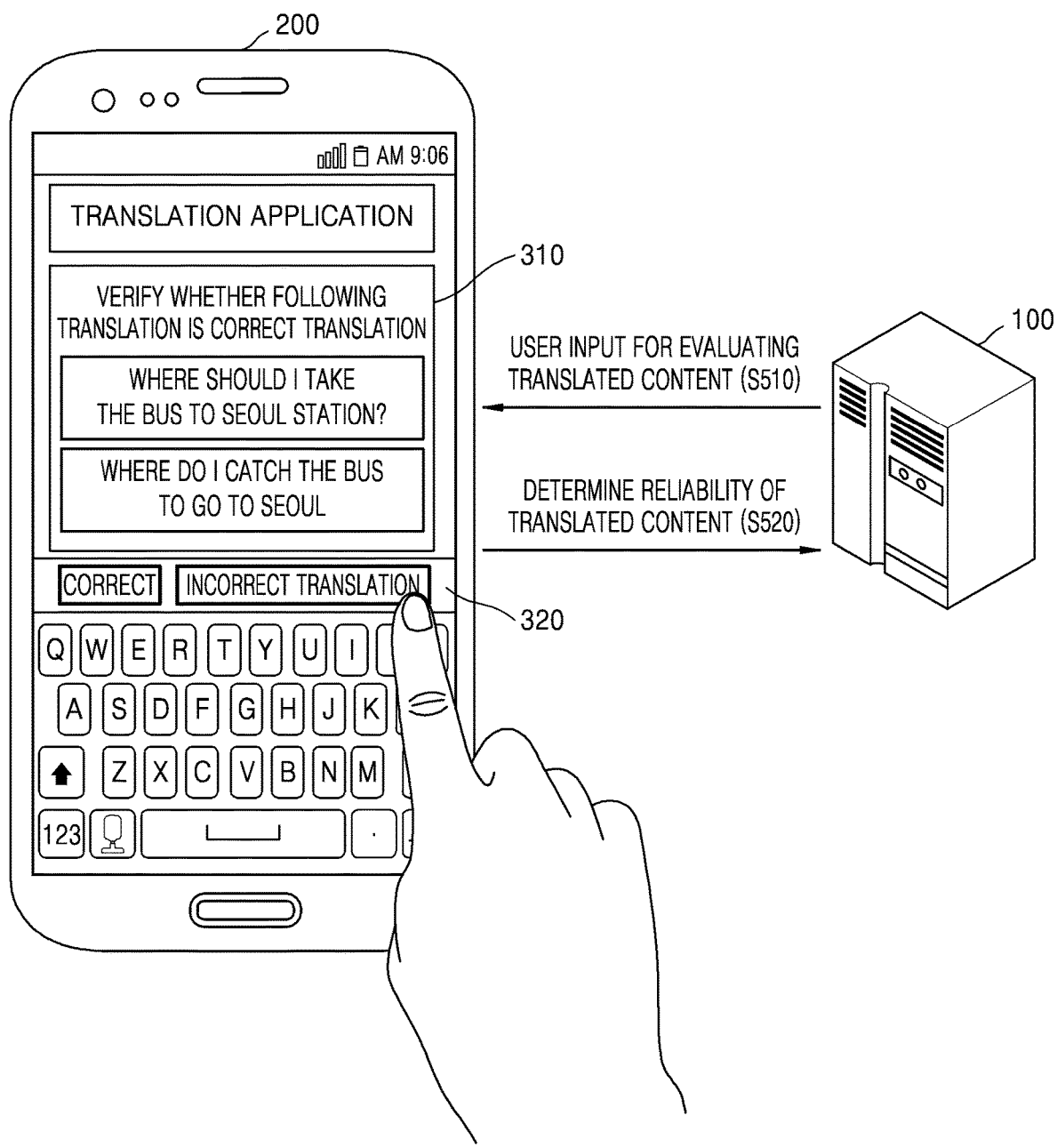
FIG. 5 is a conceptual diagram illustrating a method of verifying translated content collected by a translation server, according to an embodiment of the present disclosure.

FIG. 5 is a conceptual diagram illustrating a method of verifying translated content collected by the translation server 100, according to an embodiment of the present disclosure.

In operation S510, the translation server 100 may provide the device 200 with a GUI for receiving a user input for evaluating the translated content. In an embodiment, the translation server 100 may provide a combination of the translation target content and the translated content translated from the translation target content and provide a GUI for receiving a user evaluation input for verifying whether the translated content is a suitable translation of the translation target content.

The device 200 may display a translated content verification GUI 310 received from the translation server 100 on a display screen thereof. The translated content verification GUI 310 may include a word or a sentence constructed in the first language (Korean in FIG. 5). Also, the translated content verification GUI 310 may provide a combination of the translation target content constructed in the first language and the translated content translated from the translation target content into the second language by the user of the device 200. The translated content verification GUI 310 may include a verification input GUI 320 for receiving a user's evaluation input for verifying whether the translated content is a suitable translation of the translation target content. Through the verification input GUI 320 displayed on the device 100, the user may select whether the translated content is a suitable translation or an incorrect translation of the translation target content.

In operation S520, the device 200 may determine the reliability of the translated content. In an embodiment, through the verification input GUI 320 from the device 200, the translation server 100 may receive a user's evaluation input about whether the translated content acquired by the device 200 is a suitable translation of the translation target content. The translation server 100 may determine the reliability of the translated content based on the received user's evaluation input.

In an embodiment, based on the received user's evaluation input, the translation server 100 may receive a translated content provider evaluation input for evaluating the user providing the translated content. For example, a first user may input the translated content of the translation target content into the translation server 100, and then a second user may input, into the device 200 of the second user, an evaluation input indicating that the translated content input by the first user is an unsuitable translation of the translation target content. The translation server 100 may receive the translated content provider evaluation input about the first user by the second user through the network. In an embodiment, the translation server 100 may determine the reliability of the translated content based on the translated content provider evaluation input.

In an embodiment, the translation server 100 may store history information about the provider providing the translated content selected as a suitable translation of the translation target content. Also, the translation server 100 may store information about the count of selection as the suitable translated content with respect to each translated content provider. Also, the translation server 100 may store information about the probability of selection as the suitable translated content with regard to the translated content provision count with respect to each translated content provider.

In an embodiment, the translation server 100 may determine the reliability of the translated content based on the history information about the translated content provider. For example, the reliability of the translated content provided by the translated content provider may be evaluated to be higher as the count of selection of the translated content as the suitable translated content increases or as the probability of selection of the translated content as the suitable translated content increases.

Figure 6:
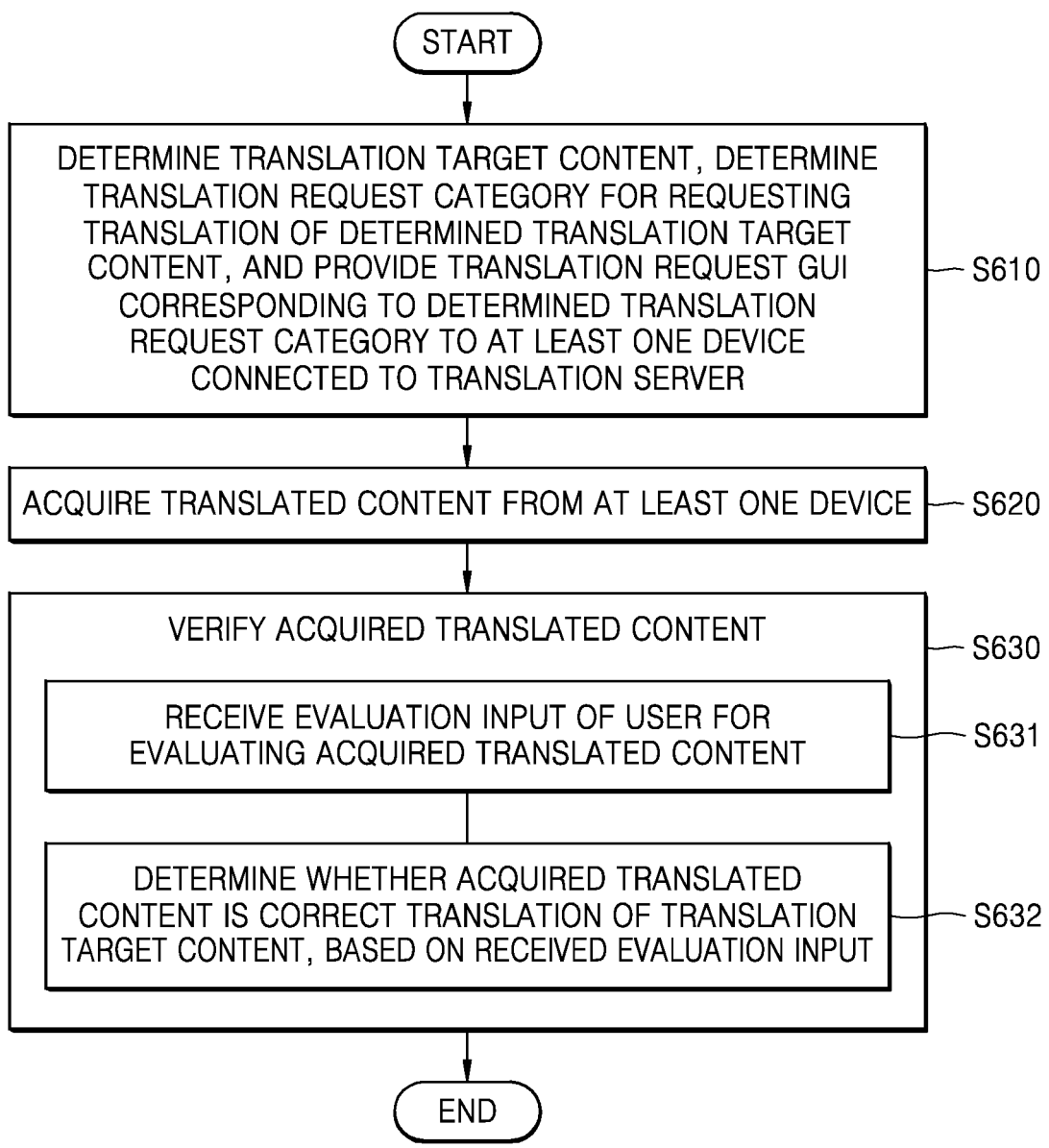
FIG. 6 is a flowchart illustrating a method of verifying translated content collected by a translation server, according to an embodiment of the present disclosure.

FIG. 6 is a flowchart illustrating a method of verifying translated content collected by the translation server 100, according to an embodiment of the present disclosure.

In operation S610, the translation server 100 may determine the translation target content, determine a translation request category for requesting translation of the determined translation target content, and provide a translation request GUI corresponding to the determined translation request category to at least one device connected to the translation server 100. Operation S610 is the same as operations S210 to S230 described above with reference to FIG. 2, and thus redundant descriptions thereof will be omitted for conciseness.

In operation S620, the translation server 100 may acquire the translated content from the at least one device. Operation S620 is the same as operation S240 described above with reference to FIG. 2, and thus redundant descriptions thereof will be omitted for conciseness.

In operation S630, the translation server 100 may verify the acquired translated content. In an embodiment, the translation server 100 may provide the at least one device with a GUI for receiving a user input for evaluating the translated content.

In operation S631, the translation server 100 may receive a user's evaluation input for evaluating the acquired translated content. In an embodiment, the translation server 100 may provide the at least one device with a combination of the translation target content constructed in the first language and the translated content translated from the translation target content into the second language and provide a GUI for receiving a user's evaluation input for verifying whether the translated content is a suitable translation of the translation target content. In an embodiment, the translation server 100 may receive the user's evaluation input about the translated content through the at least one device.

In operation S632, based on the received user's evaluation input, the translation server 100 may determine whether the acquired translated content is a suitable translation of the translation target content. In an embodiment, the translation server 100 may receive the user's evaluation input about the provider providing the translated content and determine the reliability of the translated content based on the evaluation input about the translated content provider. In an embodiment, the translation server 100 may determine the reliability of the translated content based on the history information of the translated content provider selected as a suitable translation thereof. The history information may mean, for example, information about the count or probability of selection of the translated content provided by the translated content provider as a suitable translation of the translation target content.

Figure 7:
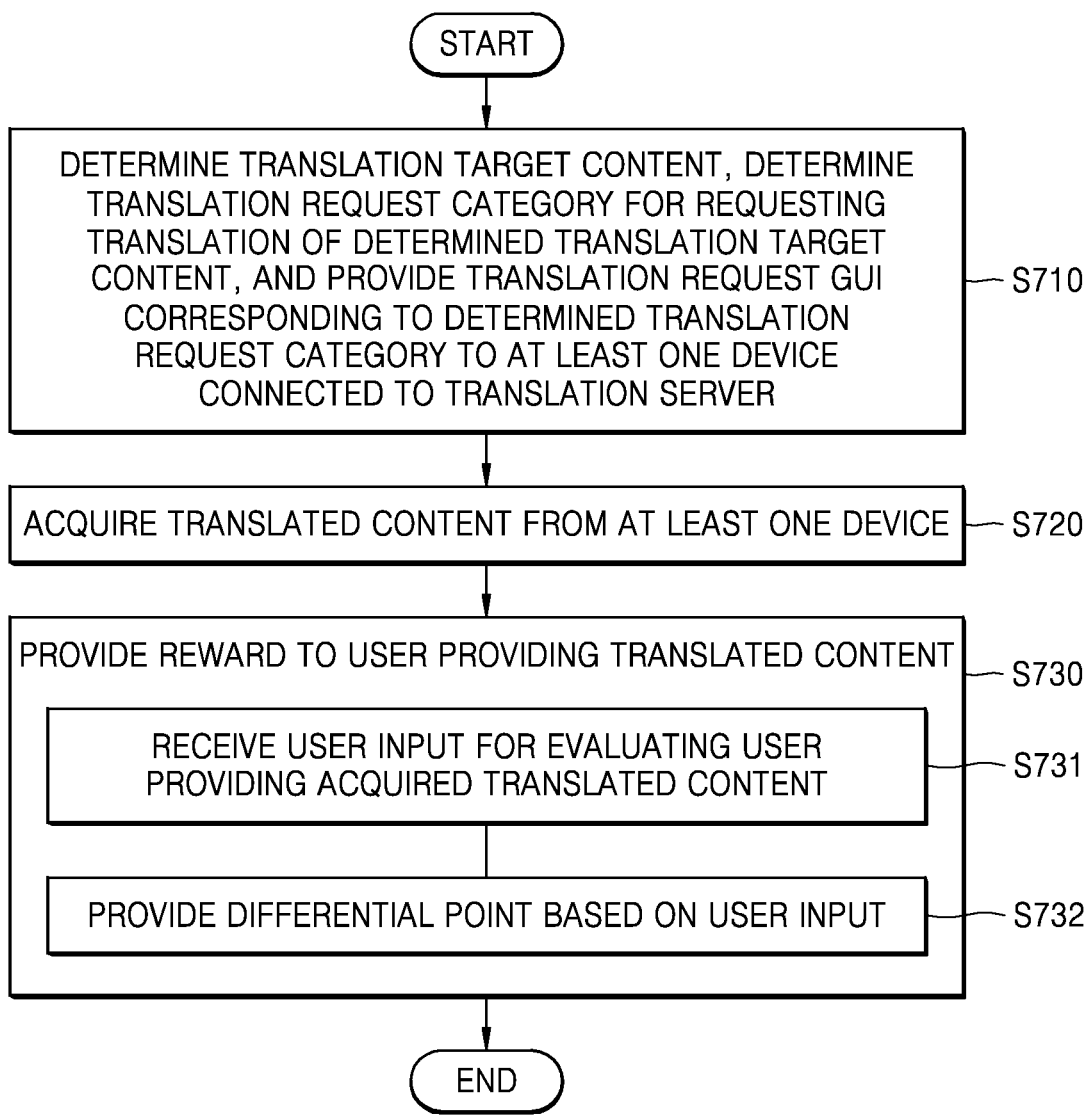
FIG. 7 is a flowchart illustrating a method by which a translation server provides a reward to a user providing translated content, according to an embodiment of the present disclosure.

FIG. 7 is a flowchart illustrating a method of providing, by the translation server 100, a reward to a user providing translated content, according to an embodiment of the present disclosure.

In operation S710, the translation server 100 may determine the translation target content, determine a translation request category for requesting translation of the determined translation target content, and provide a translation request GUI corresponding to the determined translation request category to at least one device connected to the translation server 100. Operation S710 is the same as operations S210 to S230 described above with reference to FIG. 2, and thus redundant descriptions thereof will be omitted for conciseness.

In operation S720, the translation server 100 may acquire the translated content from the at least one device. Operation S720 is the same as operation S240 described above with reference to FIG. 2, and thus redundant descriptions thereof will be omitted for conciseness.

In operation S730, the translation server 100 may provide a reward to the user providing the translated content. The translation server 100 may provide the translated content provider with the reward including the point that may be used in the website or application provided to the device by the translation server 100 or the goods corresponding to the point. The reward provided to the user providing the translated content may include, for example, at least one of point, cyber money, coupon, movie ticket, and lecture voucher.

In operation S731, the translation server 100 may receive a user input for evaluating the user providing the acquired translated content. In an embodiment, the translation server 100 may provide the device with a GUI for receiving a user input for evaluating the translated content provider and receive an evaluation input about the translated content provider from the user of the device. For example, the user may evaluate whether the translated content pre-stored in the translation server 100 is a suitable translation of the translation target content and evaluate the translation suitability or the translation reliability of the provider providing the translated content.

In operation S732, the translation server 100 may provide a differential point based on the evaluation input about the translated content provider. For example, when a second user evaluates the translated content translated by a first user and provided to the translation server 100 as a suitable translation of the translation target content and evaluates the reliability score of the first user as high, the translation server 100 may provide a point with a high weight to the first user. As another example, when a fourth user evaluates the translated content translated by a third user and provided to the translation server 100 as an unsuitable and incorrect translation of the translation target content, the translation server 100 may provide no point or a low-weight point to the third user.

In an embodiment, the translation server 100 may provide a differential reward to the translated content provider based on the translation request category provided to the device. For example, when the translated content provider inputs the translated content through the GUI corresponding to the direct translation request category, the translation server 100 may provide a point having a medium weight.

In an embodiment, the translation server 100 may provide a differential point to the translated content provider according to the type of the translated content. For example, a high-weight point may be provided when the translated content provider provides a translation of a coined word, and a low-weight point may be provided when the translated content provider provides a translation corresponding to a synonym.

By providing the rewards to the users providing the translated content, an embodiment of the present disclosure may increase the translation participation rate and secure a large amount of translated content, thus improving the translation rate and the translation accuracy. In particular, according to an embodiment of the present disclosure, as a circulation structure, the translation server 100 may acquire the translated content from a plurality of users, the translated content provider may receive the reward, and the translated content provider receiving the reward may again provide the translated content to the translation server 100.

FIG. 8 is a diagram illustrating the relationship between a translation request category 810, a translation request GUI 820, a translated content providing user 830, a reward type 840, and a reward weight 850 by the translation server 100, according to an embodiment of the present disclosure. The relationship diagram illustrated in FIG. 8 is merely an example, and the relationship between the translation request category 810, the translation request GUI 820, the translated content providing user 830, the reward type 840, and the reward weight 850 according to the present disclosure is not limited to the relationship diagram illustrated in FIG. 8.

Referring to FIG. 8, the translation request category 810 may include a direct translation request category 811, a translated content verification category 812, an education content provision category 813, an audiovisual content provision category 814, and a game content provision category 815. The translation request category 810 illustrated in FIG. 8 is the same as the translation request category 400 illustrated in FIG. 4, and thus redundant descriptions thereof will be omitted for conciseness.

The translation request GUI 820 may be different according to the translation request category 810. For example, according to the translation request category 810, by the translation server 100, to the device, the direct translation request category 811 may provide a first GUI 821, the translated content verification category 812 may provide a second GUI 822, the education content provision category 813 may provide a third GUI 823, the audiovisual content provision category 814 may provide a fourth GUI 824, and the game content provision category 815 may provide a fifth GUI 825. Examples of the translation request GUI 820 are the same as those described above with reference to FIGS. 3A to 3H, and thus redundant descriptions thereof will be omitted for conciseness.

The translated content providing user 830 may be a different group according to the translation request category 810. The translated content providing user 830 may be classified as a different group based on age, sex, education, occupation, or the like. For example, the user providing the translated content through the first GUI 821 corresponding to the direct translation request category 811 may be a general user or expert group 831. For example, the user providing the translated content through the third GUI 823 corresponding to the education content provision category 813 may be a group 833 of student, preschool children, infants, or teachers. For example, the user providing the translated content through the fifth GUI 825 corresponding to the game content provision category 815 may be a general user, student, or infant group 835. However, the relationship between the translation request category 810 and the corresponding user group described herein is merely an example and is not limited thereto.

The reward type 840 may be provided as a different type according to the translation request category 810. The reward type 840 may include, but is not limited to, at least one of point, coupon, movie ticket, voucher, and gift. For example, the translation server 100 may provide a point or coupon 841 to the user providing the translated content through the first GUI 821 corresponding to the direct translation request category 811. For example, the translation server 100 may provide a point or movie ticket 844 to the user providing the translated content through the fourth GUI 824 corresponding to the audiovisual content provision category 814. However, the relationship between the translation request category 810 and the corresponding reward type described herein is merely an example and is not limited thereto.

The reward weight 850 may be applied differentially according to the translation request category 810. In an embodiment, the reward weight 850 may be applied to a reward type that may quantify the money amount or the corresponding amount (e.g., the lecture attendance count) such as coupon or voucher. For example, the translation server 100 may apply a medium reward weight 851 to the translated content providing user inputting the translated content with respect to the direct translation request category 811 and apply a high reward weight 852 to the translated content providing user inputting the translated content with respect to the translated content verification category 812. However, the relationship between the translation request category 810 and the corresponding reward weight described herein is merely an example and is not limited thereto.

Figure 9:
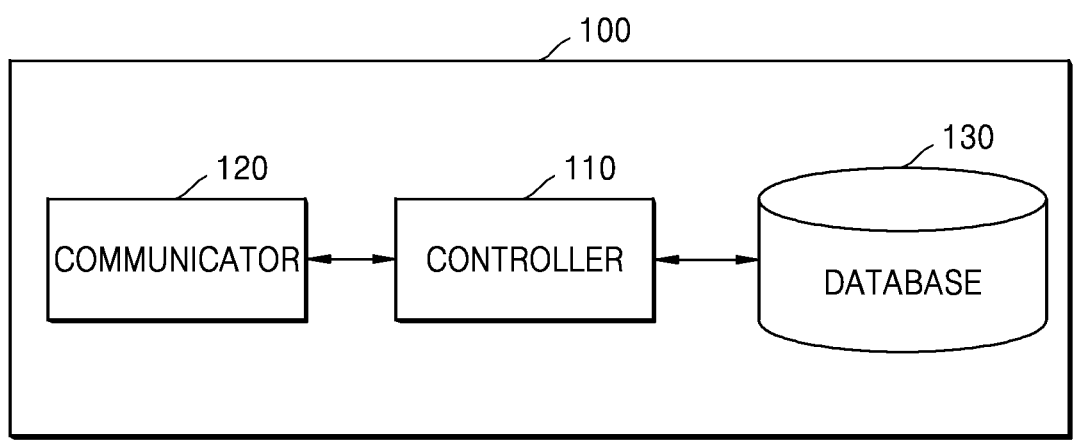
FIG. 9 is a block diagram illustrating a configuration of a translation server according to an embodiment of the present disclosure.

FIG. 9 is a block diagram illustrating a configuration of the translation server 100 according to an embodiment of the present disclosure.

Referring to FIG. 9, the translation server 100 may include a controller 110, a communicator 120, and a database 130.

In general, the controller 110 may control an overall operation of the translation server 100. For example, the controller 110 may control an overall operation of the communicator 120 and the database 130 by executing a program stored in a memory.

The controller 110 may include a central processing unit (CPU) having an operation circuit and a logic circuit. In an embodiment, the controller 110 may include at least one of a CPU, a random-access memory (RAM), a read-only memory (ROM), a graphic processing unit (GPU), and a bus. In an embodiment, the controller 110 may be implemented as an application processor (AP). In an embodiment, the controller 110 may be implemented as a hardware component such as a field-programmable gate array (FPGA) or an application-specific integrated circuit (ASIC). However, the present disclosure is not limited thereto, and the controller 110 may include components such as software components, object-oriented software components, class components, and task components and may include processes, functions, attributes, procedures, subroutines, segments of program code, drivers, firmware, micro codes, circuits, data, databases, data structures, tables, arrays, and variables.

The controller 110 may include a machine translator for providing the translated content translated into the second language from the translation target content constructed in the first language. The machine translator may have its own machine translation engine, or may provide the translated content in cooperation with a machine translation engine of an external system separate from the translation server 100. In an embodiment, based on SMT, the machine translator may analyze the degree of matching through a pair of sentences or words constructed in the first language and sentences or words constructed in the second language and statistically determine which matching is a suitable translation pair. The machine translator may update at least one of the sentence, word, single corpus, corpus pair, morpheme, phrase, and word order stored in the database 130 based on the translated content acquired from the user through the GUI corresponding to the translation request category and learn (train) whether the updated sentence, word, single corpus, corpus pair, phrase, or word order matches with the translation target content or is a more suitable translation than the translated content pre-stored in the database 130. The machine translator may provide the matching result acquired through the learning (training) to the database 130 as feedback.

In an embodiment, the controller 110 may determine the translation target content constructed in the first language and determine the translation request category for requesting translation of the determined translation target content to a plurality of devices connected to the translation server 100.

In an embodiment, the controller 110 may select at least one of corpuses, coined words, acronyms, proper nouns, technical terms, and dialogues as the translation target content according to a predetermined criterion.

The controller 110 may select at least one of the direct translation request category, the translated content verification category, the education content provision category, the audiovisual content provision category, and the game content provision category as the translation request category.

In an embodiment, the controller 110 may determine the GUI corresponding to the determined translation request category. The controller 110 may generate a translation request GUI of a predetermined type with respect to the translation request category. For example, when the controller 110 determines the education content provision category as the translation request category provided to the plurality of devices, the controller 110 may provide the education content to the plurality of devices. For example, when the controller 110 determines the audiovisual content provision category as the translation request category, the controller 110 may provide the audiovisual content such as music or movies to the plurality of devices. The translation request GUI provided to the plurality of devices in a plurality of types has been described above with reference to FIGS. 3A to 3H, and thus redundant descriptions thereof will be omitted for conciseness.

The controller 110 may verify the acquired translated content. In an embodiment, the controller 110 may receive the translated content evaluation input provided from a plurality of users using the plurality of devices through the communicator 120 and determine the reliability of the translated content based on the received evaluation input. The controller 110 may receive a translated content provider evaluation input for evaluating the user providing the translated content from the communicator 120 and verify the translated content based on the translated content provider evaluation input. In an embodiment, the controller 110 may determine the reliability of the translated content based on the history information of the translated content provider stored in the database 130. For example, the controller 110 may evaluate the reliability of the translated content provided by the translated content provider to be higher as the count of selection of the translated content as the suitable translated content increases or as the probability of selection of the translated content as the suitable translated content increases.

The controller 110 may provide the reward to the user providing the translated content by using the device. In an embodiment, the controller 110 may differentially provide the points or the goods corresponding to the points to the users providing the translated content according to the determined translation request category. In an embodiment, the controller 110 may receive a translated content provider evaluation input for evaluating the user providing the translated content from the communicator 120 and differentially provide the points or the goods corresponding to the points to the users providing the translated content based on the translated content provider evaluation input.

The communicator 120 may connect the plurality of devices and the translation server 100 by wire or wireless through at least one network among wired/wireless Internet service, local area network, broadband communication network, intranet, mobile computing service, wireless data communication service, satellite communication service, and Bluetooth. The communicator 120 may include at least one of a data communication module, a local communication module, a broadband communication module, a mobile communication module, a wireless local area network (LAN) module, and a Bluetooth module.

The communicator 120 may transmit the translation request GUI determined by the controller 110 to the plurality of devices connected to the translation server 100 through the network. The communicator 120 may receive the translated content input by the user through the GUI displayed on the plurality of devices.

The communicator 120 may receive the user's evaluation input for evaluating the translated content. In an embodiment, the communicator 120 may receive the user's evaluation input for verifying the translated content input through the verification input GUI 320 (see FIG. 5) displayed on the display screen of the plurality of devices and transmit the received user's evaluation input to the controller 110.

Also, the communicator 120 may receive the translated content provider evaluation input for evaluating the user providing the translated content.

The database 130 may be a space capable of storing data in the form of any one of non-relational Structured Query Language (NoSQL), relational database, and file system. The database 130 may store the translation target content, the translated content translated by the machine translator included in the controller 110, and the translated content acquired from the plurality of users through the plurality of devices. In an embodiment, the database 130 may store at least one of the sentence, word, corpus, morpheme, phrase, and word order constructed in the first language and the sentence, word, corpus, morpheme, phrase, and word order constructed in the second language. In an embodiment, the database 130 may store information about a pair of the translation target content including the sentence, word, corpus, morpheme, phrase, or the like constructed in the first language and the corresponding translated content including the sentence, word, corpus, morpheme, phrase, or the like constructed in the second language. The translated content pre-stored in the database 130 may be updated by the translated content acquired from the plurality of users through the communicator 120.

The database 130 may also store other information in addition to the translated content. This will be described with reference to FIG. 10.

Figure 10:
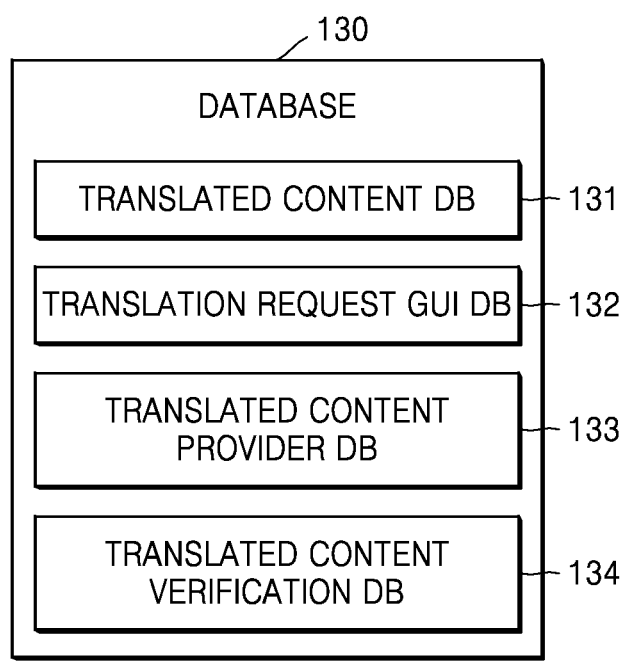
FIG. 10 is a block diagram illustrating a configuration of a database of a translation server, according to an embodiment of the present disclosure.

FIG. 10 is a block diagram illustrating a configuration of the database 130 of the translation server 100 according to an embodiment of the present disclosure.

Referring to FIG. 10, the database 130 may include a translated content database (DB) 131, a translation request GUI DB 132, a translated content provider DB 133, and a translated content verification DB 134. The database 130 may be a data storage space implemented in the form of any one of NoSQL, relational database, and file system. Each of the translated content DB 131, the translation request GUI DB 132, the translated content provider DB 133, and the translated content verification DB 134 may be a logically-divided storage device, may be a division unit for logically dividing one or more storage devices, or may be a portion of a logically-divided division unit or a physically-divided storage device.

The translated content DB 131 may store the translation target content including at least one of the sentence, word, corpus, morpheme, phrase, and word order constructed in the first language and the translated content including at least one of the sentence, word, corpus, morpheme, phrase, and word order constructed in the second language. In an embodiment, the translated content DB 131 may store the translated content translated by the machine translator of the controller 110 and the translated content acquired from the plurality of users of the plurality of devices through the communicator 120.

The translation request GUI DB 132 may store the translation request GUIs corresponding to the translation request category determined by the controller 110. The descriptions of the translation request GUI are the same as those described above with reference to FIGS. 3A to 3H, and thus redundant descriptions thereof will be omitted for conciseness.

The translated content provider DB 133 may store information about the users providing the translated content by using the plurality of devices. In an embodiment, the translated content provider DB 133 may store information about the age, sex, education, occupation, and/or the like of the user providing the translated content. In an embodiment, the translated content provider DB 133 may store history information selected as a suitable translation of the translation target content with respect to each translated content provider. Also, the translated content provider DB 133 may store information about the count of selection as the suitable translated content and the probability of selection as the suitable translation with respect to each translated content provider.

The translated content verification DB 134 may store information about the translated content verified or evaluated as a suitable translation of the translation target content, among the translated content stored in the translated content DB 131.

The method according to an embodiment may be embodied in the form of program commands executable through various computer means, which may be recorded on a computer-readable recording medium. The computer-readable recording medium may include program commands, data files, and data structures either alone or in combination. The program commands recorded on the computer-readable recording medium may be those that are especially designed and configured for the present disclosure, or may be those that are known and available to computer programmers skilled in the art. Examples of the computer-readable recording mediums may include magnetic recording mediums such as hard disks, floppy disks, and magnetic tapes, optical recording mediums such as compact disk read-only memories (CD-ROMs) and digital versatile disks (DVDs), magneto-optical recording mediums such as floptical disks, and hardware devices such as ROMs, RAMs, and flash memories that are especially configured to store and execute program commands. Examples of the program commands may include machine language codes that may be generated by a compiler, and high-level language codes that may be executed by a computer by using an interpreter.

The scope of the present disclosure is defined not by the above detailed description but by the following claims, and all modifications or differences within the scope should be construed as being included in the scope of the present disclosure.

The invention claimed is:

1. A method by which a server collects translated content, the method comprising:
   determining translation target content constructed in a first language;
   determining a translation request category for requesting translation of the determined translation target content among a plurality of translation request categories;
   determining a translation request graphical user interface (GUI) corresponding to the determined translation request category among a plurality of translation request GUIs corresponding to the plurality of translation request categories and providing the determined translation request GUI to at least one device connected to the server the plurality of translation request GUIs being different from each other; and
   acquiring, from the at least one device, translated content translated from the translation target content into a second language,
   wherein
   the translation request GUI comprises a translation request message corresponding to the determined translation request category, and
   the translated content is input to the device through the translation request GUI.

2. The method of claim 1, wherein the determining of the translation target content comprises selecting at least one of a corpus, a coined word, an acronym, a proper noun, a technical term, and a dialogue as translation target content, according to a predetermined criterion.

3. The method of claim 1, wherein the translation request category comprises at least one of a direct translation request category, a translated content verification category, an educational content provision category, an audiovisual content provision category, and a game content provision category.

4. The method of claim 1, further comprising verifying the acquired translated content,
   wherein the verifying of the acquired translated content comprises:
   receiving an evaluation input of a user for evaluating the acquired translated content; and
   determining reliability of the acquired translated content, based on the received evaluation input.

5. The method of claim 4, further comprising evaluating the user providing the acquired translated content, based on the received evaluation input,
   wherein the verifying of the translated content comprises verifying the translated content based on an evaluation result regarding the user providing the translated content.

6. The method of claim 1, further comprising updating a database of the server, based on the acquired translated content.

7. The method of claim 1, further comprising, by using the at least one device, providing a reward to at least one user providing the translated content,
   wherein the providing of the reward comprises providing a differential point to the at least one user providing the translated content, according to the determined translation request category.

8. A computer-readable recording medium having recorded thereon a program that, when executed by a computer, performs the method of claim 1.

9. A translation server for collecting translated content, the translation server comprising:
   a controller configured to determine translation target content constructed in a first language, determine a translation request category for requesting translation of the determined translation target content among a plurality of translation request categories, and determine a graphical user interface (GUI) corresponding to the determined translation request category among a plurality of translation request GUIs corresponding to the plurality of translation request categories;

a communicator configured to transmit the determined GUI to at least one device connected to the server and acquire, from the at least one device, translated content translated from the translation target content into a second language; and a storage storing the acquired translated content, wherein the GUI comprises a translation request message corresponding to the determined translation request category, and the translated content is input to the device through the GUI.

10. The translation server of claim 9, wherein the controller is further configured to select, as the translation target content, at least one of a corpus, a coined word, an acronym, a proper noun, a technical term, and a dialogue, according to a predetermined criterion.

11. The translation server of claim 9, wherein the translation request category comprises at least one of a direct translation request category, a translated content verification category, an educational content provision category, an audiovisual content provision category, and a game content provision category.

12. The translation server of claim 9, wherein the communicator is further configured to receive an evaluation input of a user for evaluating the acquired translated content, and the controller is further configured to determine reliability of the acquired translated content, based on the received evaluation input.

13. The translation server of claim 12, wherein the controller is further configured to evaluate the user providing the acquired translated content and verify the translated content, based on an evaluation result of the user providing the translated content.

14. The translation server of claim 9, wherein the controller is further configured to update the translated content stored in the storage, based on the acquired translated content.

15. The translation server of claim 9, wherein the controller is further configured to provide a reward to at least one user providing the translated content by using the at least one device, and, according to the determined translation request category, provide a differential point to the at least one user.

* * * * *